(12) United States Patent
Anand et al.

(10) Patent No.: US 12,254,618 B2
(45) Date of Patent: Mar. 18, 2025

(54) CIRCUIT APPARATUS, ELECTRONIC INSTRUMENT, AND ERROR DETECTION METHOD

(71) Applicant: Seiko Epson Corporation, Tokyo (JP)

(72) Inventors: Kumar Anandabairavasamy Anand, Richmond (CA); Hideki Matsuda, Chino (JP); Sebdani Mahmood Mazrouei, Markham (CA)

(73) Assignee: SEIKO EPSON CORPORATION (JP)

(*) Notice: Subject to any disclaimer, the term of this patent is extended or adjusted under 35 U.S.C. 154(b) by 331 days.

(21) Appl. No.: 17/411,441

(22) Filed: Aug. 25, 2021

(65) Prior Publication Data
US 2022/0067900 A1 Mar. 3, 2022

(30) Foreign Application Priority Data
Aug. 26, 2020 (JP) .................. 2020-142188

(51) Int. Cl.
*G06T 7/00* (2017.01)

(52) U.S. Cl.
CPC .... *G06T 7/001* (2013.01); *G06T 2207/10024* (2013.01); *G06T 2207/20021* (2013.01);
(Continued)

(58) Field of Classification Search
None
See application file for complete search history.

(56) References Cited

U.S. PATENT DOCUMENTS

| | | |
|---|---|---|
| 5,692,072 A | 11/1997 | Hashimoto |
| 2005/0074160 A1 | 4/2005 | Miyashita |

(Continued)

FOREIGN PATENT DOCUMENTS

| | | |
|---|---|---|
| DE | 102015012889 A1 | 4/2017 |
| JP | H04-174306 A | 6/1992 |

(Continued)

OTHER PUBLICATIONS

Suzuki et al., "Data Position Detection Using Fast Fourier Transform Cross-Correlation Method for Holographic Memory," Japanese Journal of Applied Physics, vol. 47, No. 1, pp. 183-188 (Year: 2008).*

(Continued)

*Primary Examiner* — Vincent Rudolph
*Assistant Examiner* — Nicholas Crespo Stazer
(74) *Attorney, Agent, or Firm* — Harness, Dickey & Pierce, P.L.C.

(57) ABSTRACT

A circuit apparatus includes an image acquisition circuit, an error detection circuit, and a search circuit. The error detection circuit determines an indicator representing the degree of dissimilarity between a foreground image and a background image out of a display image based on the result of correlation operation and performs error detection on the display image based on the indicator. The search circuit searches the display image for the display position of the foreground image based on the reference image, which serves as a reference for the foreground image. The error detection circuit performs the error detection based on the display position searched for by the search circuit.

8 Claims, 16 Drawing Sheets

(52) U.S. Cl.
CPC ............... *G06T 2207/20056* (2013.01); *G06T 2207/20072* (2013.01); *G06T 2207/30108* (2013.01)

(56) References Cited

U.S. PATENT DOCUMENTS

| | | | |
|---|---|---|---|
| 2007/0078922 | A1 | 4/2007 | Sano et al. |
| 2012/0036418 | A1 | 2/2012 | Morino et al. |
| 2019/0213071 | A1 | 7/2019 | Anand et al. |
| 2019/0250981 | A1* | 8/2019 | Anand .................. G06T 7/0004 |

FOREIGN PATENT DOCUMENTS

| | | | |
|---|---|---|---|
| JP | H06-231254 A | | 8/1994 |
| JP | 11185018 A | * | 7/1999 |
| JP | 2000-003444 A | | 1/2000 |
| JP | 2004-326728 A | | 11/2004 |
| JP | 2005-116626 A | | 4/2005 |
| JP | 2005-208739 A | | 8/2005 |
| JP | 2007-072394 A | | 3/2007 |
| JP | 2007-078511 A | | 3/2007 |
| JP | 2007-101691 A | | 4/2007 |
| JP | 2007-188174 A | | 7/2007 |
| JP | 2008-015848 A | | 1/2008 |
| JP | 2012-035677 A | | 2/2012 |
| JP | 2020-107351 A | | 7/2020 |
| WO | 2015/097855 A1 | | 7/2015 |

OTHER PUBLICATIONS

Debella-Gilo et al., "Sub-pixel precision image matching for measuring surface displacements on mass movements using normalized cross-correlation," Remote Sensing of Environment, vol. 115, pp. 130-142 (Year: 2011).*

* cited by examiner

CIRCUIT APPARATUS, ELECTRONIC INSTRUMENT, AND ERROR DETECTION METHOD

The present application is based on, and claims priority from JP Application Serial Number 2020-142188, filed Aug. 26, 2020, the disclosure of which is hereby incorporated by reference herein in its entirety.

BACKGROUND

1. Technical Field

The present disclosure relates to a circuit apparatus, an electronic instrument, an error detection method, and the like.

2. Related Art

In display control performed by a display apparatus, a processing apparatus, such as a CPU, transmits image data and a control signal to a display controller, the display controller performs image processing and generates a timing signal, and a display driver drives a display panel by using the image data having undergone the image processing and the timing signal. In the communication described above, the image data received by the display controller may contain a data error that occurs due, for example, to a communication error. For example, JP-A-2012-35677, JP-A-2007-101691, and JP-A-2007-72394 each disclose a technology for CRC-based error detection in image data received by a display controller from a processing apparatus. CRC is an abbreviation for cyclic redundancy check. There is also a known approach for searching an image for an object area. Such an approach is disclosed, for example, in JP-A-2008-15848.

In a case where an icon or any other object is displayed in a display image and an error in the displayed icon or any other object is detected, when the error detection is performed on a display area specified in advance, the position where the icon or any other object is displayed is limited to the display area specified in advance in order to detect the error in the displayed icon or any other object, resulting in a problem of a decrease in the flexibility of display design. The technology disclosed in JP-A-2008-15848 only relates to efficient search for an object area, and JP-A-2008-15848 does not disclose a series of technologies for object area detection and image error detection.

SUMMARY

An aspect of the present disclosure relates to a circuit apparatus including an image acquisition circuit that acquires a display image, an error detection circuit that determines histograms of pixel values of the display image, performs correlation operation using the histograms, determines an indicator representing a degree of dissimilarity between a foreground image that is an image of a given area of the display image and a background image that corresponds to a background of the foreground image out of the display image based on a result of the correlation operation, and performs error detection on the display image based on the indicator, and a search circuit. The search circuit searches the display image for a display position of the foreground image based on a reference image that serves as a reference for the foreground image, and the error detection circuit performs the error detection based on the display position searched for by the search circuit.

Another aspect of the present disclosure relates to a circuit apparatus including an image acquisition circuit that acquires a display image, an error detection circuit that determines an indicator representing a degree of agreement between a foreground image that is an image of a given area of the display image and a reference image that serves as a reference for the foreground image based on pixel values of the display image and pixel values of the reference image or based on pixel values of an edge image of the display image and pixel values of an edge image of the reference image, the error detection circuit performing error detection on the display image based on the indicator, and a search circuit. The search circuit searches the display image for a display position of the foreground image based on the reference image, and the error detection circuit performs the error detection based on the display position searched for by the search circuit.

Still another aspect of the present disclosure relates to an electronic apparatus including the circuit apparatus described in any of the aspects described above.

Still another aspect of the present disclosure relates to an error detection method including searching a display image for a display position of a foreground image that is an image of a given area of the display image based on a reference image that serves as a reference for the foreground image, determining histograms of pixel values of the display image based on the display position searched for, performing correlation operation using the histograms, determining an indicator representing a degree of dissimilarity between the foreground image and a background image corresponding to a background of the foreground image based on a result of the correlation operation, and performing error detection on the display image based on the indicator.

Still another aspect of the present disclosure relates to an error detection method including searching a display image for a display position of a foreground image that is an image of a given area of the display image based on a reference image that serves as a reference for the foreground image, determining an indicator representing a degree of agreement between the foreground image and the reference image based on the display position searched for, pixel values of the display image, and pixel values of the reference image or based on the display position searched for, pixel values of an edge image of the display image, and pixel values of an edge image of the reference image, and performing error detection on the display image based on the indicator.

DESCRIPTION OF EXEMPLARY EMBODIMENTS

A preferable embodiment of the present disclosure will be described below in detail. It is not intended that the present embodiment described below unduly limits the contents set forth in the appended claims, and all configurations described in the present embodiment are not necessarily essential configuration requirements.

1. Circuit Apparatus

Figure 1:
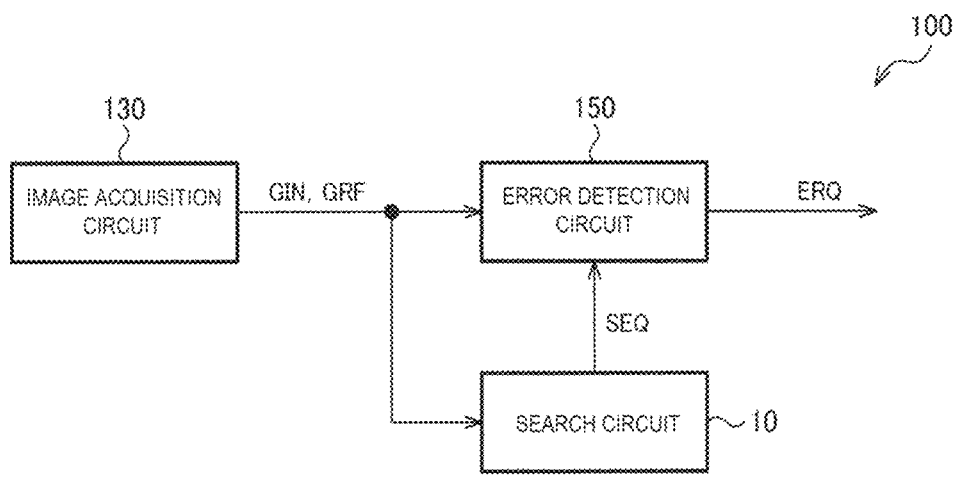
FIG. 1 shows an example of the configuration of a circuit apparatus.

FIG. 1 shows an example of the configuration of a circuit apparatus 100 according to the present embodiment. The circuit apparatus 100 includes a search circuit 10 and an error detection circuit 150. The circuit apparatus 100 is achieved, for example, by an integrated circuit apparatus in which circuit elements are integrated on a semiconductor substrate.

An image acquisition circuit 130 acquires a display image GIN and outputs the display image GIN to the search circuit 10 and the error detection circuit 150. The display image GIN is an image that is the combination of a foreground image and a background image. The image acquisition circuit 130 further acquires a reference image GRF, which serves as a reference for the foreground image, and outputs the reference image GRF to the search circuit 10 and the error detection circuit 150. For example, in the display image GIN shown in FIG. 3, a meter image is the background image, and an icon image is overlaid as a foreground image GZN on the meter image. The foreground image GZN is an image that is the result of extraction of an icon portion from the reference image GRF shown in FIG. 4. The entire reference image GRF may be overlaid as the foreground image GZN on the meter image.

The image acquisition circuit 130 may, for example, be an interface that receives the display image GIN and the reference image GRF from an apparatus outside the circuit apparatus 100, a memory access circuit that reads the display image GIN and the reference image GRF stored in a memory, or an overlaying circuit that overlays the foreground image on the background image. In a detailed configuration example described later in FIG. 8, the image acquisition circuit 130 is an overlaying circuit as merely one example. It is assumed in FIG. 1 that the image acquisition circuit 130 acquires the display image GIN and the reference image GRF, but not necessarily, and the reference image GRF may be inputted to the search circuit 10 and the error detection circuit 150, for example, from a memory without via the image acquisition circuit 130. In FIG. 1, the display image GIN and the reference image GRF are inputted to the error detection circuit 150, but when the error detection circuit 150 does not use the reference image GRF, the reference image GRF may not be inputted to the error detection circuit 150. For example, the reference image GRF is not used in some cases when the error detection circuit 150 determines a visibility indicator described later.

The search circuit 10 searches for the display position of the foreground image in the display image GIN based on the reference image GRF. Specifically, the search circuit 10 determines the cross-correlation between the display image GIN and the reference image GRF by calculating the product of the display image GIN and the reference image GRF in the frequency domain by using two-dimensional FFT and performing IFFT on the product. FFT is an abbreviation for Fast Fourier Transform, and IFFT is an abbreviation for Inverse Fast Fourier Transform. The search circuit 10 compares the cross-correlation with a detection threshold, and when the search circuit 10 finds a position where the correlation value is greater than or equal to the detection threshold, the search circuit 10 detects the position as the display position of the foreground image. When the search circuit 10 finds no position where the correlation value is greater than or equal to the detection threshold, the search circuit 10 determines that no foreground image is displayed in the display image GIN. The detection threshold is a threshold that allows the search circuit 10 to evaluate whether or not a foreground image is displayed in the display image GIN. The detection threshold may be stored in memory or a register in advance or may be set in a memory or a register via an apparatus outside the circuit apparatus 100. The search circuit 10 outputs a search result SEQ, which is the result of the search for the display position, to the error detection circuit 150.

The error detection circuit 150 performs error detection on the display image GIN based on the display position searched for by the search circuit 10 and outputs an error detection result ERQ. Specifically, the error detection circuit 150 sets an error detection area that contains the foreground image and is smaller than the display image GIN based on the display position searched for by the search circuit 10 and performs the error detection by analyzing an image of the error detection area. The error detection circuit 150 determines an indicator representing whether the foreground image is properly displayed in the error detection area and performs the error detection based on the indicator. The indicator is a visibility indicator that allows the error detection circuit 150 to assess the visibility of the foreground image or a shape indicator that allows the error detection circuit 150 to assess the similarity between the shape of the foreground image and the shape of the reference image. The indicators will be described later. The error detection result ERQ is outputted, for example, in the form of the result of comparison between the indicator and a threshold value or the indicator itself.

In the present embodiment described above, the circuit apparatus 100 includes the image acquisition circuit 130, which acquires the display image GIN, the error detection circuit 150, which performs error detection on the display image GIN, and the search circuit 10. The search circuit 10 searches for the display position of the foreground image in the display image GIN based on the reference image GRF, which serves as a reference for the foreground image. The error detection circuit 150 performs the error detection based on the display position searched for by the search circuit 10.

According to the present embodiment, the error detection circuit 150 can perform the error detection based on the display position searched for by the search circuit 10 and can therefore perform the error detection even when the display position of the foreground image is not determined in advance. An icon or any other object can therefore be displayed in any position, whereby the flexibility of the display design can be improved. The aforementioned series of processes for the error detection are not disclosed in JP-A-2012-35677 or the other patent documents described above.

Further, in the present embodiment, the error detection circuit 150 performs the error detection when the search circuit 10 detects the display position in the search operation described above and does not perform the error detection when the search circuit 10 does not detect the display position in the search operation described above. That is, the error detection circuit 150 performs the error detection when the search circuit 10 can detect a position where the correlation value is equal to or greater than the detection threshold and does not perform the error detection when the search circuit 10 cannot detect a position where the correlation value is equal to or greater than the detection threshold.

According to the present embodiment, the error detection is performed when the foreground image is contained in the display image GIN, and the error detection is not performed when the foreground image is not contained in the display image GIN. For example, when frame images of a video are inputted as the display image GIN, it is assumed that an icon or any other object is displayed in the display image GIN in some cases and not in other cases. According to the present embodiment, when an icon or any other object is displayed in such a video, whether or not the icon or any other object is properly displayed can be checked. The technology that allows the image search and the error detection to be performed as a series of processes is not disclosed in JP-A-2012-35677 or the other patent documents described above.

2. Search Circuit and Error Detection Circuit

Figure 2:
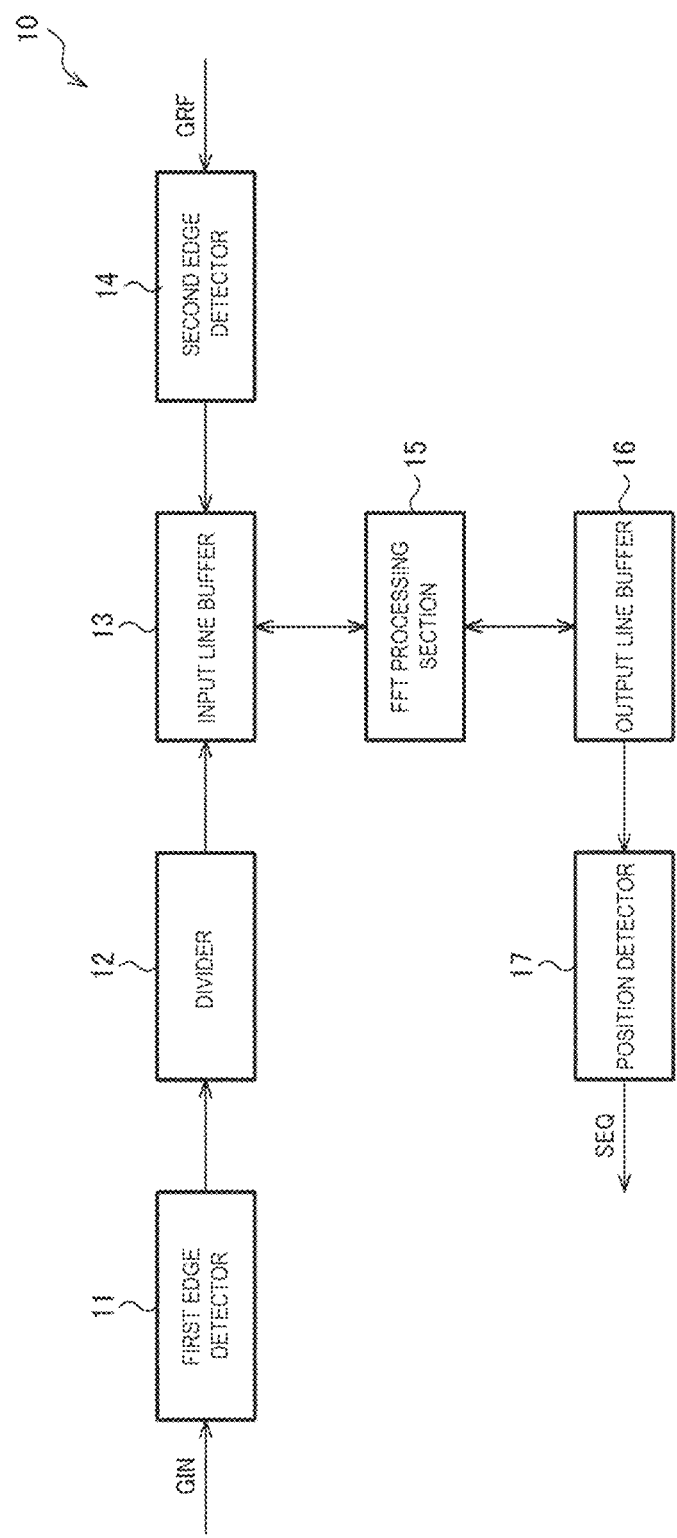
FIG. 2 shows an example of the detailed configuration of a search circuit.

FIG. 2 shows an example of the detailed configuration of the search circuit 10. The search circuit 10 includes a first edge detector 11, a divider 12, an input line buffer 13, a second edge detector 14, an FFT processing section 15, an output line buffer 16, and a position detector 17. In the following sections, a description will be made of an example in which the cross-correlation between the display image and the reference image is indirectly determined by performing cross-correlation operation between an edge image of the display image and an edge image of the reference image, but not necessarily, and the cross-correlation between the display image and the reference image may be directly determined.

Figure 3:
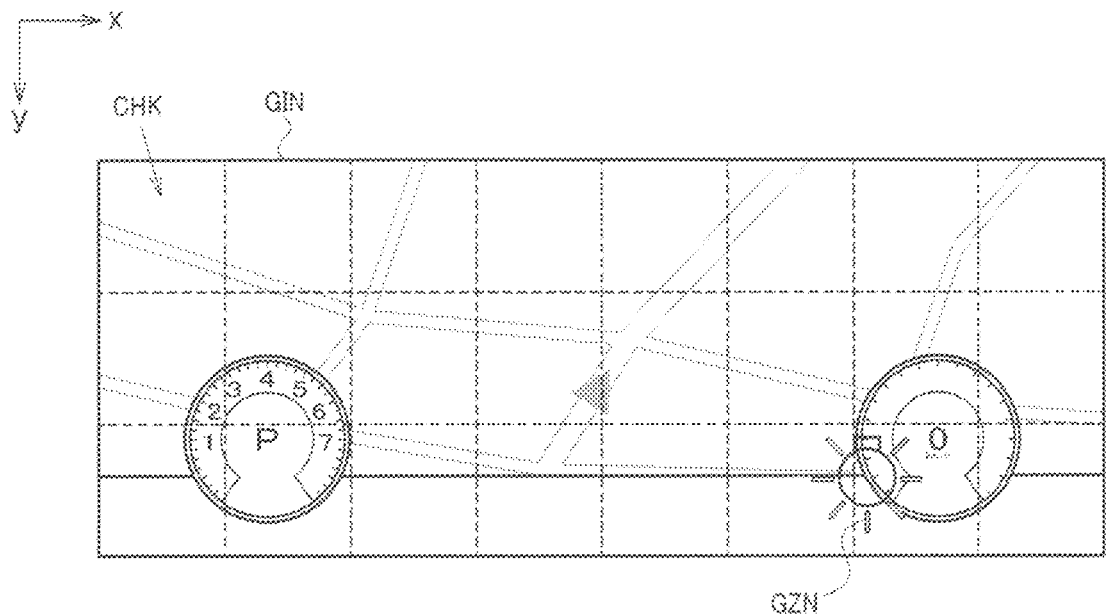
FIG. 3 shows an example of a display image.

The first edge detector 11 extracts an edge image of the display image GIN by filtering the display image GIN. The filtering may, for example, be Sobel filtering and may instead be any filtering that allows edge extraction. FIG. 3 shows an example of the display image GIN. In this example, an icon that is the foreground image GZN is overlaid on a meter image that is the background image. The edge image extracted from the display image GIN contains edge components of the background image and edge components of the foreground image GZN.

The divider 12 divides the edge image of the display image GIN into a plurality of individual areas CHK. FIG. 3 shows an example in which the edge image is divided into 3×8 individual areas CHK. FIG. 3 shows the individual areas CHK resulting from the display image GIN, but it is noted that the edge image of the display image is divided into the individual areas. Specifically, the divider 12 divides the edge image into a plurality of band-shaped areas and then divides each of the band-shaped areas into individual areas. In FIG. 3, band-shaped areas in three rows are divided into eight columns, resulting in the 3×8 individual areas CHK.

Figure 4:
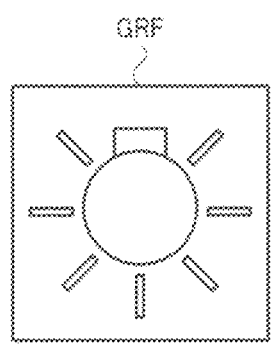
FIG. 4 shows an example of a reference image.

The second edge detector 14 extracts an edge image of the reference image GRF by filtering the reference image GRF. The filtering may, for example, be Sobel filtering and may instead be any filtering that allows edge extraction. FIG. 4 shows an example of the reference image GRF. The edge image extracted from the reference image GRF contains an edge image of the icon portion. When the foreground image GZN in the display image GIN is correctly displayed, the edge image of the foreground image GZN is similar to the edge image of the reference image GRF.

The input line buffer 13 stores the edge images of the individual areas CHK and the edge image of the reference image GRF. The FFT processing section 15 uses FFT and IFFT to determine the cross-correlation between the edge image of each of the individual areas CHK and the edge image of the reference image GRF. The output line buffer 16 stores the cross-correlation determined for each of the individual areas CHK. The input line buffer 13 and the output line buffer 16 temporarily store data intermediately generated by the FFT processing section 15.

Figure 5:
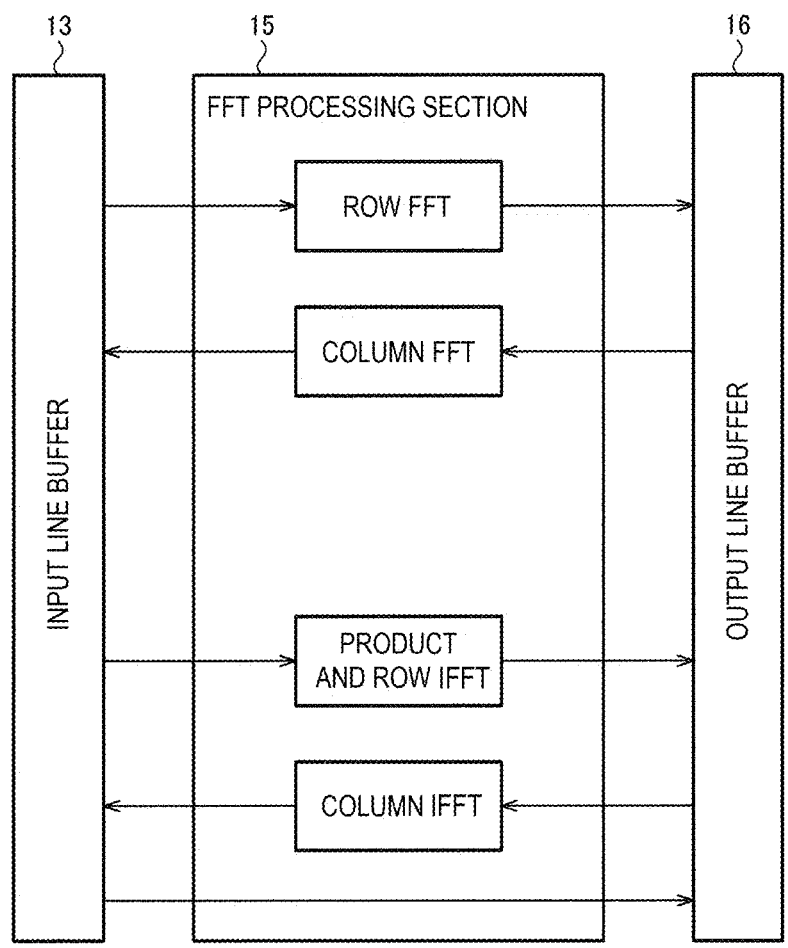
FIG. 5 is the procedure of processes carried out by an FFT processing section.

FIG. 5 shows the flowchart of processes carried out by the FFT processing section 15. The FFT processing section 15 performs the following row FFT on the edge image of each of the individual areas CHK and the edge image of the reference image GRF. The FFT processing section 15 reads the edge image row by row from the input line buffer 13, performs FFT on the read row, and writes the result of the FFT row by row onto the output line buffer 16. The results of the FFT performed on the rows are data formed of the same number of points, and the results of the row FFT are data formed of a matrix of points as a whole. The row FFT, which is one-dimensional FFT, outputs a plurality of spatial frequency components corresponding to a plurality of spatial frequencies, and the individual spatial frequency components are referred to as points in the description.

The FFT processing section 15 then performs the following column FFT on the result of the row FFT performed on the edge image of each of the individual areas CHK and the result of the row FFT performed on the edge image of the reference image GRF. The FFT processing section 15 reads the results of the row FFT from the output line buffer 16 column by column, performs FFT on the read column, and writes the result of the FFT column by column onto the input line buffer 13. The results of the FFT performed on the columns are data formed of the same number of points, and the results of the two-dimensional FFT are data formed of a matrix of points as a whole. The row FFT and the column FFT described above together form the two-dimensional FFT. The result of the two-dimensional FFT performed on the edge image of each of the individual areas CHK and the result of the two-dimensional FFT performed on the edge image of the reference image GRF are data sets having the same number of rows and columns. For example, assuming that the individual areas CHK each have L×L pixels, the reference image GRF has M×M pixels, and the results of the two-dimensional FFT are formed of nc rows by nb columns, nc and nb are so set that nc≥L+M−1 and nb≥L+M−1 are satisfied. Typically, nc=nb is satisfied, and nc and nb may instead differ from each other. L, M, nc, and nb are each an integer greater than or equal to two.

The FFT processing section 15 then calculates the products of the results of the two-dimensional FFT performed on the edge images of the individual areas CHK and the result of the two-dimensional FFT performed on the edge image of the reference image GRF and performs row IFFT on the products. Specifically, the FFT processing section 15 reads the results of the two-dimensional FFT performed on the edge images of the individual areas CHK and the two-dimensional FFT performed on the edge image of the reference image GRF from the input line buffer 13 row by row and multiplies the results point by point. That is, assuming that i is 1, 2, . . . , nc and j is 1, 2, . . . , nb, the i-row-by-j-column data as the result of the two-dimensional FFT performed on the edge images of the individual areas CHK are multiplied by the i-row-by-j-column data as the result of the two-dimensional FFT performed on the edge image of the reference image GRF. The FFT processing section 15 performs IFFT on the product row by row and writes the result of the IFFT row by row onto the output line buffer 16.

The FFT processing section 15 then performs column IFFT shown below on the results of the row IFFT. The FFT processing section 15 reads the results of the row IFFT from the output line buffer 16 column by column, performs IFFT on each of those columns, and writes the results of the IFFT column by column onto the input line buffer 13. The row IFFT and the column IFFT described above together form two-dimensional IFFT. The result of the two-dimensional IFFT is the cross-correlation between the edge images of the individual areas CHK and the edge image of the reference image GRF, so that the cross-correlation is produced for each of the individual areas CHK. The cross-correlation for each of the individual areas CHK is transferred from the input line buffer 13 to the output line buffer 16 and outputted from the output line buffer 16 to the position detector 17.

Figure 6:
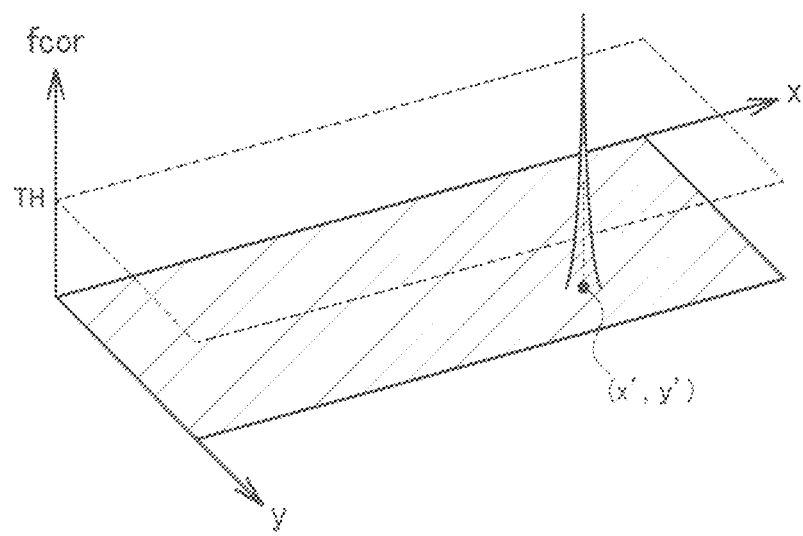
FIG. 6 shows an example of the cross-correlation between a display image and a reference image.

The position detector 17 generates cross-correlation between the display image GIN and the reference image GRF by combining the cross-correlations of the individual areas CHK with one another. FIG. 6 shows an example of a cross-correlation fcor between the display image GIN and the reference image GRF. The parameter x represents the horizontal coordinate in the display image GIN in FIG. 3, and the parameter y is the vertical coordinate in the display image GIN in FIG. 3. The cross-correlation fcor has a correlation value in each position (x, y). The position detector 17 compares the cross-correlation fcor with a detection threshold TH to evaluate whether or not there is a position (x, y) where fcor≥TH is satisfied. In FIG. 6, fcor≥TH is satisfied in a position (x', y'). The position detector 17 detects the position (x', y'), where fcor≥TH is satisfied, as the display position of the foreground image GZN. When the position detector 17 determines that there is no position where fcor≥TH is satisfied, the position detector 17 determines that the foreground image GZN is not displayed in the display image GIN.

Figure 7:
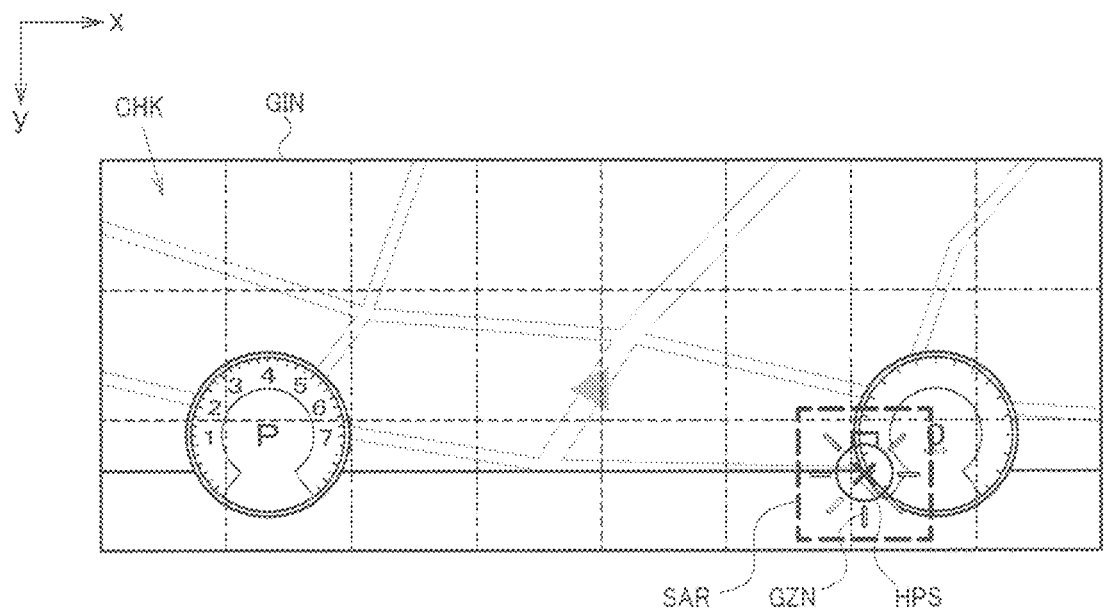
FIG. 7 describes the operation of an error detection circuit.

FIG. 7 describes the operation of the error detection circuit 150. HPS represents the display position detected by the search circuit 10. The following description will be made of a case where the center of the icon corresponding to the center of the reference image GRF is detected as the display position. The error detection circuit 150 sets an error detection area SAR, which contains the foreground image GZN, based on the display position HPS. In the example shown in FIG. 7, the error detection circuit 150 sets a rectangular area that is formed around the display position HPS and can contain the foreground image GZN as the error detection area SAR. The approach for setting the error detection area SAR is, however, not limited to the above approach, and the error detection area SAR only needs to be an area that contains the foreground image GZN and is smaller than the display image GIN. The display position HPS may not be the center of the icon. The error detection circuit 150 determines the visibility indicator or the shape indicator, which will be described later, from an image of the set error detection area SAR and uses the visibility indicator or the shape indicator to evaluate whether the foreground image GZN is properly displayed or not.

In the present embodiment described above, the search circuit 10 determines the cross-correlation between the display image GIN and the reference image GRF and evaluates whether or not the cross-correlation has a correlation value greater than the detection threshold TH. When the cross-correlation has a correlation value greater than the detection threshold, the search circuit 10 detects the position (x', y') corresponding to the correlation value greater than the detection threshold as the display position, and when the cross-correlation has no correlation value greater than the detection threshold, the search circuit 10 detects no display position.

According to the present embodiment, the search circuit 10 can detect a position where the degree of correlation between the display image GIN and the reference image GRF is large as the display position of the foreground image GZN. A series of actions can then be achieved as follows: When the search circuit 10 can detect the display position, the error detection circuit 150 performs the error detection; and when the search circuit 10 cannot detect the display position, the error detection circuit 150 does not perform the error detection.

In the present embodiment, the search circuit 10 divides the display image GIN into a plurality of band-shaped areas, divides each of the plurality of band-shaped areas into a plurality of individual areas CHK, and searches each of the plurality of individual areas CHK. The search circuit 10 searches the plurality of individual areas in parallel.

According to the present embodiment, after the display image GIN is divided into the plurality of individual areas CHK, the cross-correlation between each of the individual areas CHK and the reference image GRF is calculated, and the cross-correlations calculated for the individual areas CHK can be combined with one another to acquire the cross-correlation between the display image GIN and the reference image GRF. Further, the parallel calculation of the cross-correlations between the individual areas CHK and the reference image GRF can improve the processing speed. For example, when the error detection is performed on a video, it is desirable that the delay that occurs before the error detection is completed is small, and improvement in the processing speed of the cross-correlation accelerates the error detection.

In the present embodiment, the search circuit 10 performs the search by calculating the cross-correlation between the display image GIN and the reference image GRF using Fourier transform and inverse Fourier transform. In the present embodiment, FFT is used as the Fourier transform and IFFT is used as the inverse Fourier transform, but the algorithms of Fourier transform and inverse Fourier transform are not limited thereto.

According to the present embodiment, the cross-correlation is provided by multiplying the Fourier transformed display image GIN by the Fourier transformed reference image GRF in the frequency domain and then performing inverse Fourier transform on the result of the multiplication. The processing speed of the Fourier transform and inverse Fourier transform can be improved by performing the Fourier transform and inverse Fourier transform for each of the individual areas CHK.

3. Example of Detailed Configuration of Circuit Apparatus

Figure 8:
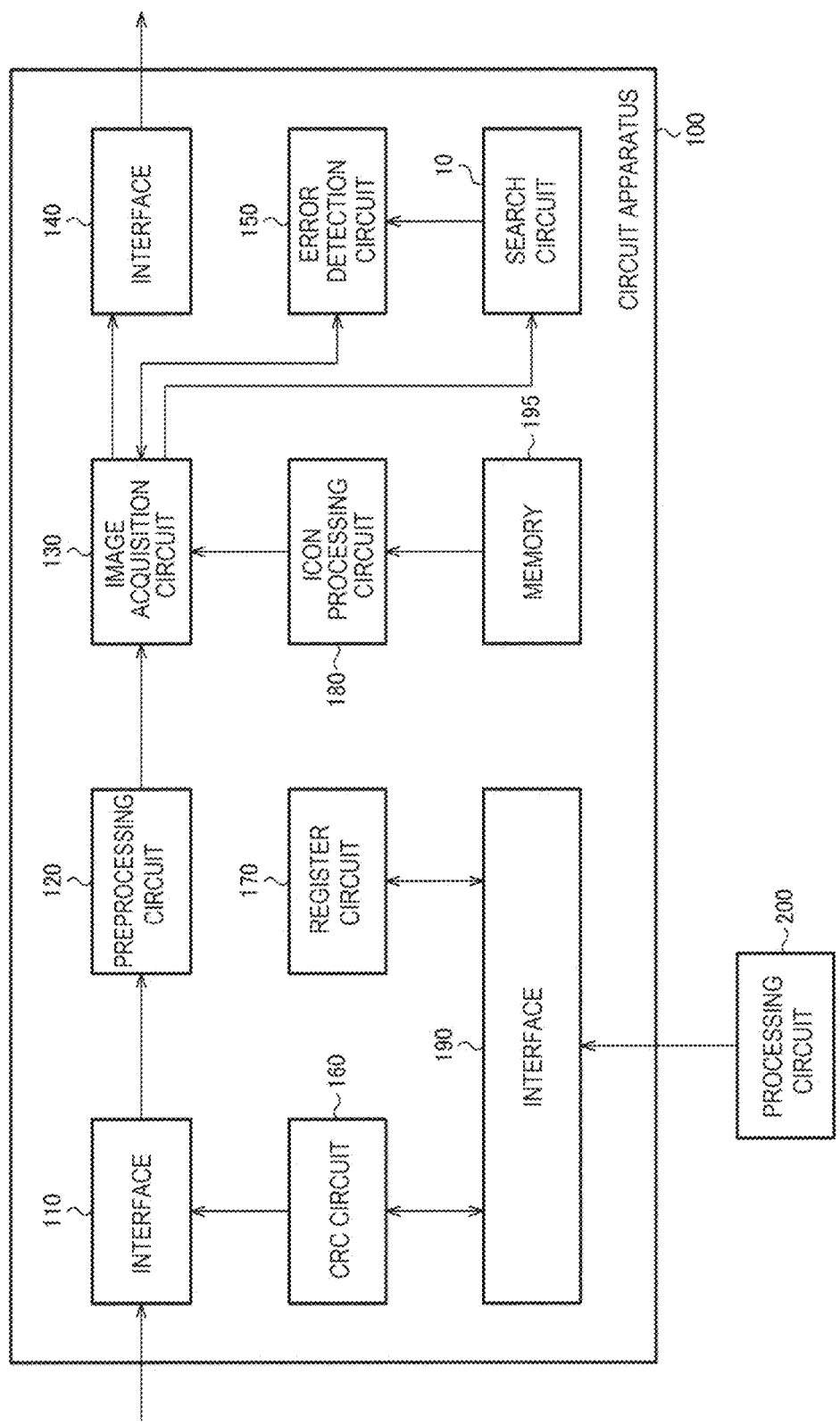
FIG. 8 shows an example of the detailed configuration of the circuit apparatus.

FIG. 8 shows an example of the configuration of the circuit apparatus according to the present embodiment. The description will be made of a case where the circuit apparatus 100 is a display controller, but the search circuit 10 and the error detection circuit 150 do not necessarily form a display controller. The display controller is also referred to as a ICON, that is, a timing controller.

The circuit apparatus 100 includes an interface 110, a preprocessing circuit 120, an image acquisition circuit 130, an interface 140, an error detection circuit 150, a CRC circuit 160, a register circuit 170, an icon processing circuit 180, an interface 190, and a memory 195. In the following description, the display image is also called an image under analysis, and the error detection area is also called a region of interest or an ROI. ROI is an abbreviation for a region of interest.

The interface 110 receives image data transmitted, for example, from a processing apparatus 200 to the circuit apparatus 100 and converts the received image data into image data having a format used in the circuit apparatus 100. For example, the interface 110 is an OpenLDI interface, which converts a serial signal received in the form of LVDS into RGB parallel signals. The processing apparatus 200 is, for example, an MCU or a CPU. OpenLDI is an abbreviation for an open LVDS display interface, LVDS is an abbreviation for low voltage differential signaling, MCU is an abbreviation for a micro control unit, and CPU is an abbreviation for a central processing unit.

The preprocessing circuit 120 performs a variety of types of image processing on the image data inputted from the interface 110. For example, the preprocessing circuit 120 performs gamma correction, FRC, white balancing, and other types of processing. FRC is an abbreviation for frame rate control. For example, a one-dimensional lookup table for each of R, G, and B channels is stored in the memory 195, the register circuit 170, or a nonvolatile memory that is not shown, and the gamma correction is performed on each of the channels by using the lookup table. In FRC, pseudo-intermediate grayscale representation is performed by inter-frame grayscale switching. In the white balancing, for example, a one-dimensional lookup table for adjustment of the white balance is stored in the memory 195, the register circuit 170, or a nonvolatile memory that is not shown, and the RGB channels are adjusted by using the lookup table.

The icon processing circuit 180 generates or acquires an icon image. The icon image corresponds to the reference image GRF described above. For example, a mask image of an icon is stored in the memory 195, and the icon image is generated by converting the mask image into an RGB image. The mask image is a k-bit image formed of pixels each having k-bit data. The parameter k is an integer greater than or equal to one. The memory 195, the register circuit 170, or a non-volatile memory that is not shown stores $2^k$ index color tables, and the k-bit data are converted into RGB data in accordance with the color tables. For example, when k=2, the color tables are lookup tables that associate four colors with 2-bit indices. When k=1, the color tables are lookup tables that associate two colors with 1-bit indices, with "0" representing the background pixels associated with a specific color, and representing the foreground pixels associated with another color. The other color is a specific color different from the background color. The memory 195 is, for example, a RAM, such as an SRAM.

An image inputted from the preprocessing circuit 120 to the image acquisition circuit 130 is called an input image. The image acquisition circuit 130 combines the icon image with the input image by overlaying the icon image on the input image and outputs the combined image as the display image to the interface 140. The icon image combined with the input image corresponds to the foreground image GZN described above. A portion of the input image that is the portion on which the icon image is not overlaid but which remains as it is corresponds to the background image described above. For example, the image acquisition circuit 130 overlays the icon image on the input image in such a way that the icon image completely hides the background. Instead, the icon image and the background may be blended with each other at a given blend ratio. The position where the icon image is overlaid on the input image is set, for example, in the register circuit 170, the memory 195, or a nonvolatile memory that is not shown.

The above description has been made of the case where the image acquisition circuit 130 overlays the icon image, which is the foreground image, on the input image, which is the background image, but not necessarily. That is, an input image on which the icon image, which is also the foreground image, has been already overlaid may be inputted to the image acquisition circuit 130. For example, the interface 110 receives image data, for example, from the processing apparatus 200 as described above, and the image data may be image data containing an image on which the icon image has been already overlaid. In any case, the display image to be outputted by the image acquisition circuit 130 only needs to be an image containing the icon image, which is the foreground image.

The search circuit 10 searches the display image for the display position of the foreground image. The search approach has been described above. The error detection circuit 150 evaluates whether or not the icon image is properly displayed in the error detection area based on an image of the error detection area. The error detection approach will be described in detail later.

The interface 140 outputs the display image to an apparatus outside of the circuit apparatus 100. For example, the interface 140 outputs the display image to a display driver that drives a display panel. For example, the interface 140 is an LVDS interface and converts the RGB parallel signals from the image acquisition circuit 130 into an LVDS serial signal. The interface 140 stops outputting the display image when the error detection circuit 150 detects an error. Instead, the interface 140 may output the display image along with error information detected by the error detection circuit 150, and the display driver that receives the error information may operate based on the error information. The error information is, for example, an error evaluation flag or an indicator. Actions based on the error information include stopping the display action.

The interface 190 communicates setting information, control information, and other pieces of information between the circuit apparatus 100 and the processing apparatus 200. For example, the interface 190 is a serial communication interface compliant, for example, with the SPI scheme or the I2C scheme. SPI is an abbreviation for a serial peripheral interface. The setting information and the control information from the processing apparatus 200 are written, for example, onto the register circuit 170, and the circuit apparatus 100 operates in accordance with the setting information and the control information.

The CRC circuit 160 performs CRC-based error detection on the image data received by the interface 110. That is, the CRC circuit 160 compares a reference CRC value input from the processing apparatus 200 via the interface 190 with a CRC value calculated from the image data received by the interface 110 and evaluates whether or not the two CRC values coincide with each other.

The preprocessing circuit 120, the image acquisition circuit 130, the error detection circuit 150, the CRC circuit 160, and the icon processing circuit 180 are logic circuits. The logic circuits may be configured, for example, as individual circuits or as a circuit integrated, for example, by automatic placement and wiring. Some or all of the logic circuits may be achieved by a processor, such as a DSP. DSP is an abbreviation for a digital signal processor. In this case, a program or an instruction set that achieves the function of each of the circuits is stored in a memory, and the processor executes the program or the instruction set to achieve the function of the circuit.

4. Error Detection

The error detection performed by the error detection circuit 150 will be described below.

In an image processing system that displays a content on a display, it is necessary in some cases to check whether a predetermined area of an image agrees with the original intention or not. For example, consider a case where an important image is displayed on a cluster display of an automotive system. In this case, it is necessary to display predetermined important information via a visible image overlaid on the existing content displayed on the screen. Several methods for detecting whether or not the image is correctly displayed will be described below. The detection is performed by analyzing the error detection area and deriving several key indicators showing the degree to which the area is correctly displayed.

The following description will be made by using a method and concept for examining the display image with respect to a reference. The examination is accomplished by calculating the agreement of the display image with the reference image. A case where the approach in the present disclosure is applied to a color image will be described below, and the approach in the present disclosure is also applicable to a grayscale or binary image.

Figure 9:
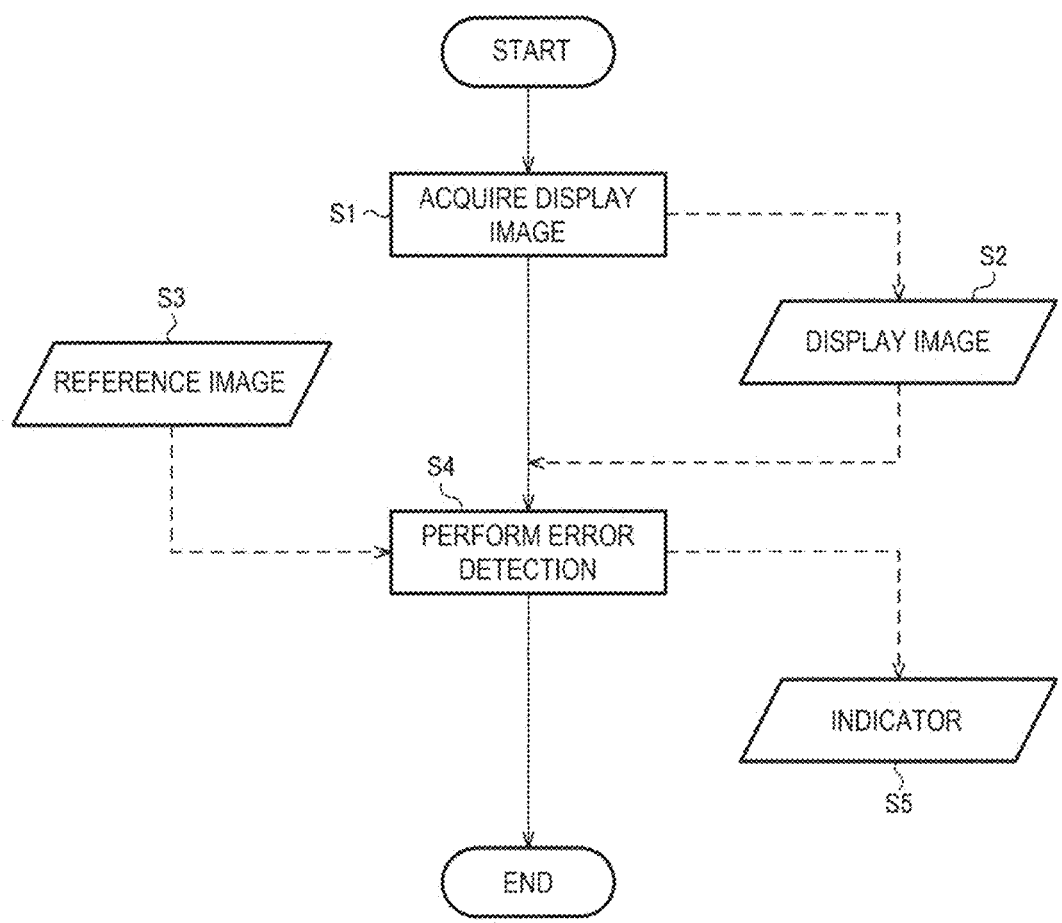
FIG. 9 is a flowchart showing the procedure of processes carried out in error detection.

FIG. 9 is a flowchart showing the procedure of the error detection. In steps S1 and S2 of the error detection, the icon image is overlaid on the input image to acquire the display image. Thereafter, in step S4, the error detection is performed by comparing the reference image acquired in step S3 with the display image acquired in step S2, and an indicator is determined in step S5. Note that the reference image is not always acquired. For example, when the visibility indicator is determined, the indicator is calculated in some cases without using the reference image but only using the display image.

In the error detection, the appropriateness of the display image in the error detection area is checked by comparing the display image with the reference image. In the comparison described above, color shifts, brightness changes, or changes due to scaling or predetermined intentional image conversion are not detected as errors, but other important errors, such as errors due to deformation resulting from unintentional rotation and cropping or noise that prevents a user from recognizing the image are detected.

To this end, two indicators, the visibility indicator and the shape indicator, are used. The visibility indicator is a numerical value that defines the degree to which an image in the error detection area can be visually recognized without blended into the background. The visibility indicator is also called a first indicator, and the shape indicator is also called a second indicator.

The error detection is applied to a color image, as described above. The error detection is also applicable to a grayscale or black-and-white image by using one channel for gray or only two values for a binary image in one channel. To this end, the format of the pixels in the error detection area of the display image is converted from the RGB format into the YCbCr format. Note, however, that the approach in the present disclosure is also applicable to other color spaces, such as Lab and Hsv.

4.1. First Calculation Approach for Determining Visibility Indicator

Figure 10:
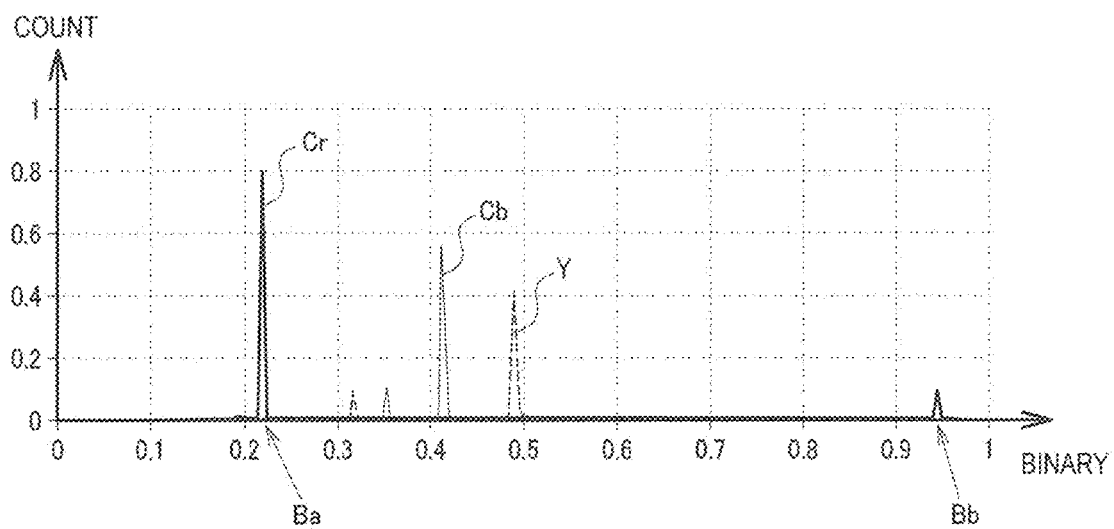
FIG. 10 is a histogram in each of channels YCbCr in an error detection area.
Figure 11:
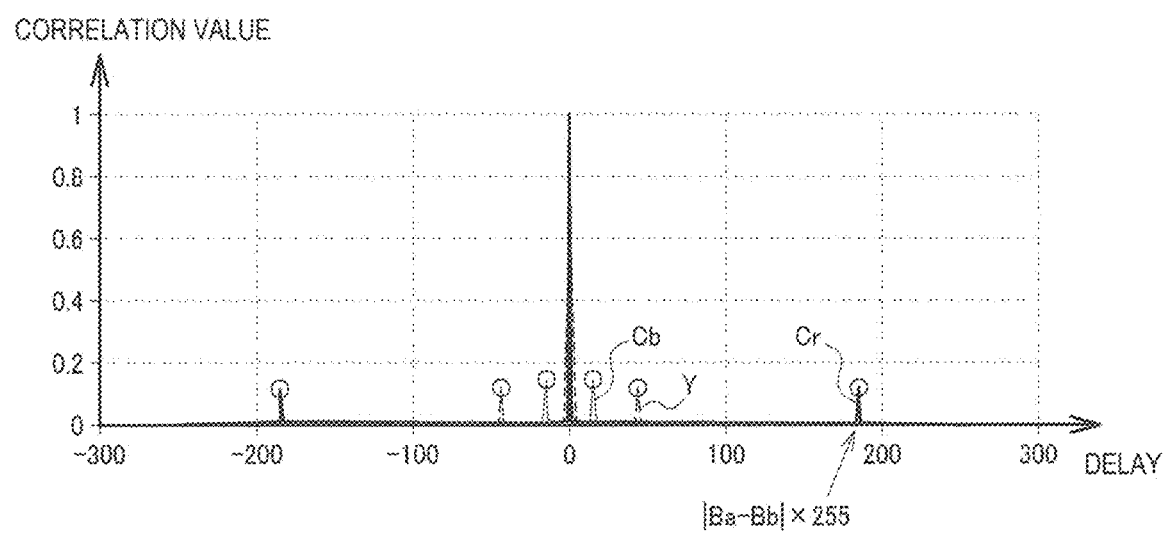
FIG. 11 shows autocorrelation values produced by performing autocorrelation operation on the histograms.

FIG. 10 shows a histogram in each of channels YCbCr in the error detection area. FIG. 11 shows autocorrelation values produced by performing autocorrelation operation on the histograms.

A histogram is determined by using n bins for each of the channels of the YCbCr image, as shown in FIG. 10. For example, 256 bins can be used to generate a histogram having a set of different bins.

In the histogram, the number of times when a particular value occurs in the error detection area is counted. That is, for each of the channels of the YCbCr image, the number of pixels having the value indicated by each of the bins is counted in the error detection area. The histogram is then normalized to values from 0 to a. As the value "a", for example, 1 or 255 can be selected in consideration of ease of implementation of the histogram. In FIG. 10, a=1. The histogram in each of the channels is then autocorrelated with itself, and the resultant autocorrelation signal is used in subsequent analysis. The autocorrelation signal is so normalized that the peak value in the case of a zero delay is 1 or a value set in advance, as shown in FIG. 11.

The autocorrelation value is determined by Expression (1) below. The parameters f and g represent functions to be correlated to each other, and in the case of autocorrelation, f=g. The functions in the description are each a histogram signal. The term f*g represents correlation operation between the functions f and g. The term f* represents the complex conjugate of the function f, and f*=f in the present embodiment. The parameter m represents the bin number of a histogram. The parameter n represents a delay, and n is an integer ranging from −255 to +255 in FIG. 11. A delay is also called a lag.

$$(f*g)[n] = \sum_{m=-\infty}^{\infty} f^*[m]g[m+n] \tag{1}$$

Note that in the histogram in FIG. 10, the horizontal axis ranges from 0 to 1 because the 256 bins are normalized to values from 0 to 1. The horizontal axis of FIG. 11 ranges from −(256-1) to +(256-1) because the correlation values are determined by changing the delay bin by bin.

When a two-color image is present in the error detection area, autocorrelation operation produces sidebands, as shown in FIG. 11. The delay-to-delay distance from the zero delay, where the peak described above occurs, represents the inter-color contrast. The contrast includes brightness contrast and color contrast. Since the contrast allows the human eye to identify the features of an image, peaks in all the three channels are checked. In FIG. 11, the dotted line represents the channel Y, the thin solid line represents the channel Cb, and the thick solid line represents the channel Cr. The peak checking is performed by setting a peak search threshold so as not to pick up noise in the autocorrelation signal. For example, a minimum peak threshold is set at 0.05. A local maximum is determined by searching the signal for a peak having a peak value greater than the threshold.

To avoid an in-band signal peak, the minimum distance between successive peaks can be set at a predetermined value. The thresholds are adjustable values and are selected in accordance with the application.

To determine the first indicator indicating whether or not an identifiable image is shown on a background having two or more colors, all peaks of the autocorrelation signal that are greater than the noise threshold are determined in all the channels, and then maximum distances at which the autocorrelation signals peak are determined. The maximum distances correspond to maximum delays. The maximum value of the delays at which the autocorrelation signals peak in the three channels is selected as the indicator representing visibility.

In the correlation plot shown in FIG. 11, the peaks are indicated by circles. In the illustrated example, the channel Cr shows the largest separation with a distance of 184. The value described above is normalized to a maximum possible delay. For example, the maximum possible delay is 256, which is the number of bins in a histogram. The indicator value is therefore 184/255=0.722. In the image shown in FIG. 12, the indicator value described above is shown as a Vis parameter. The autocorrelation operation described above is shown in one example.

Figure 12:
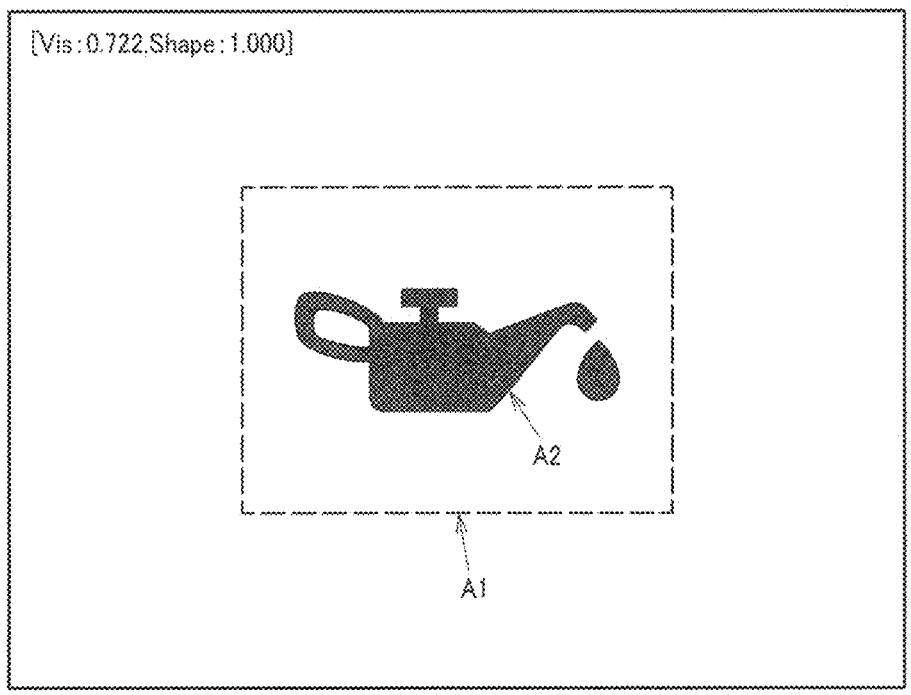
FIG. 12 shows a first example of the display image.

FIG. 12 shows a first example of the display image. A1 represents the error detection area, and A2 represents an icon. Note that the dotted line representing the error detection area is not actually drawn in the display image. For example, the interior of the icon A2 shown in black in FIG. 12 is actually colored in red, and the background shown in white in FIG. 12 is actually colored in green.

Since the image in FIG. 12 has the two color pixel groups, the red and green pixel groups, in the error detection area, the histogram shown in FIG. 10 produces two peaks in each of the channels YCbCr. For example, peaks occur at bins Ba and Bb in the channel Cr. The distance between the two peaks represents the contrast between the color of the icon, which is the foreground, and the color of the background, meaning that the greater the distance, the greater the difference between the foreground and background colors. The distance between two peaks in a histogram is the distance between delays where the autocorrelation values shown in FIG. 11 peak. In the image in FIG. 12, since the foreground is colored in red and the background is colored in green, the distance between the two peaks in the channel CR is the maximum distance in the histogram shown in FIG. 10, which is |Ba−Bb|×255. The distance is detected as the maximum distance at which the autocorrelation values shown in FIG. 11 peak, and the normalized indicator value is |Ba−Bb|. Therefore, the greater the contrast between the foreground color and the background color, the greater the visibility indicator value.

The error detection circuit 150 performs the error detection based on the visibility indicator determined as described above. For example, the visibility indicator is compared with a given threshold, and when the visibility indicator is smaller than the given threshold, it is determined that an error has occurred. Instead, the visibility indicator may be outputted as the result of the error detection to an apparatus outside the circuit apparatus 100.

4.2. Second to Fourth Calculation Approaches for Determining Visibility Indicator In a second calculation approach, the visibility indicator is determined by using cross-correlation operation.

In the first calculation approach, autocorrelation operation is used to check the reference visibility in the error detection area. The reference image in this case does not contain any information on the color or other factors of the background image. Only the display image is therefore analyzed to find out whether or not the combined image contains two or more colors.

In the second calculation approach, it is assumed that the reference image contains entire information. For example, it is assumed that a source image is changed by carrying out a display process. In this case, histograms of the reference image are created in the same manner in accordance with which the histograms of the display image are created, and cross-correlation operation between the histogram signals from the reference image and the display image can be performed in place of the autocorrelation operation. Mathematically, the autocorrelation operation is cross-correlation operation of a signal itself. The cross-correlation or autocorrelation operation can therefore be performed by changing only the signals inputted to the correlation operation. That is, in Expression (1) described above, the histograms from the reference image are set to be one of f and g, and the histograms from the display image are set to be the other of f and g.

In the case of the cross-correlation operation, determining the distance between peaks from the center is replaced with finding out whether or not the cross-correlation signal has a peak greater than a predetermined threshold. When such a peak is present, the reference image and the display image are in good agreement with each other in terms only of the pixel distribution. First-level error detection can thus be performed on the display image. The parameter does not indicate spatial correlation but indicates only pixel distribution correlation. The indicator in this case may not be the distance between the peaks from the center in the case of autocorrelation operation but may be the peak value itself.

Figure 13:
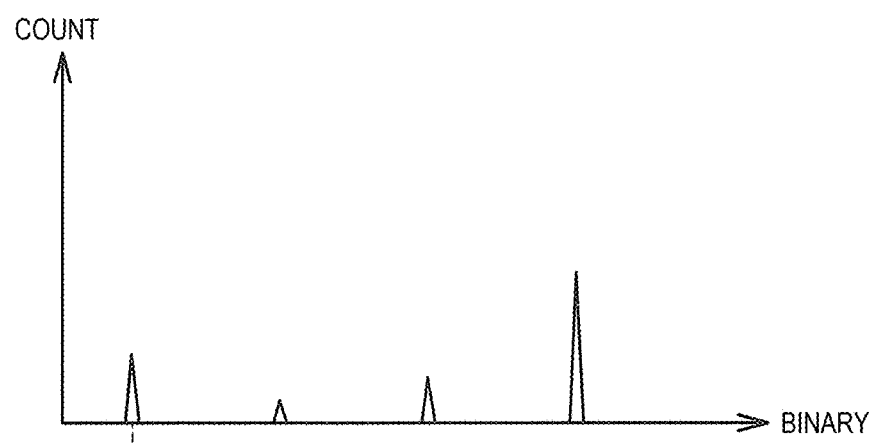
FIG. 13 shows an example of histograms when the foreground is a multitone foreground.
Figure 13:
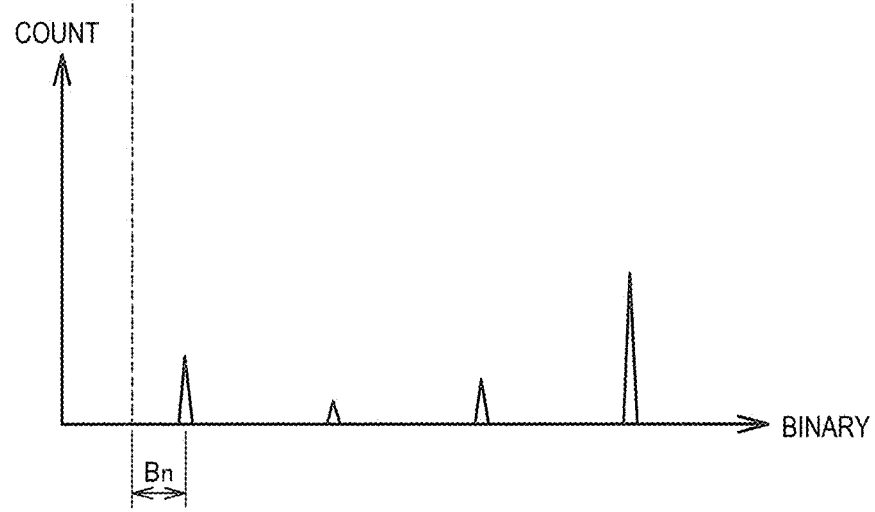
Figure 14:
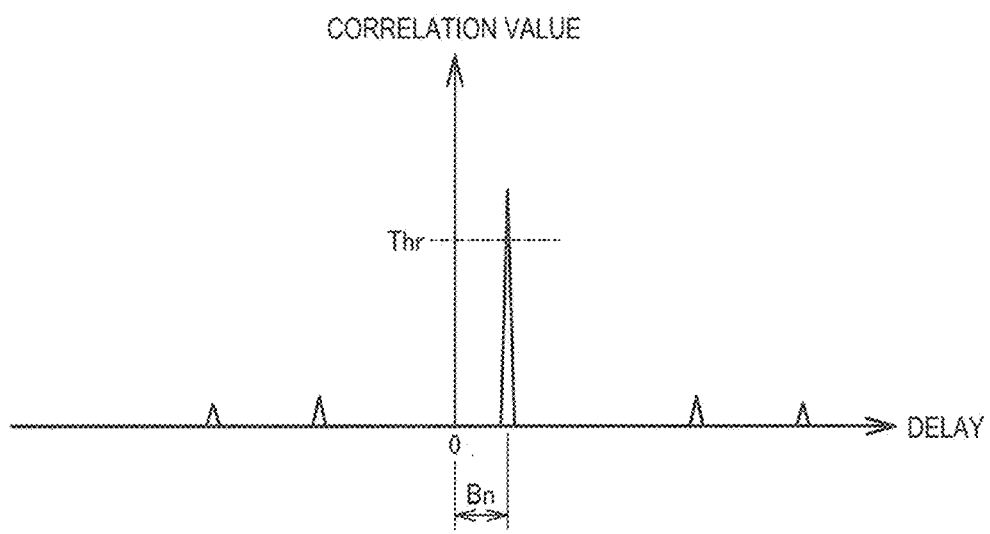
FIG. 14 shows an example of cross-correlation values of the histograms when the foreground is a multitone foreground.

FIG. 13 shows an example of histograms when the foreground, such as an icon, is a multitone foreground having two or more colors. FIG. 14 shows an example of the cross-correlation values of the histograms in FIG. 13. The description below will be made of one channel of a color image, and the same process is carried out for a plurality of channels. For example, a maximum peak value may be employed out of the cross-correlation peak values in a plurality of channels.

The histograms from the display image and the reference image have three or more peaks, as shown in FIG. 13. It is assumed that the peak of the histogram from the display image and the peak of the histogram from the reference image deviate from each other by Bn. In this case, the cross-correlation value has a large peak at the delay Bn, as shown in FIG. 14. When the peak value of the peak is greater than a threshold Thr, the peak value is, for example, employed as the visibility indicator value.

In a third calculation approach, the ratio between the contrast of the foreground and the contrast of the background is determined as the visibility indicator value.

In the first calculation approach, the difference |Ba−Bb| between the bins Ba and Bb, where peaks occur in the histogram in the channel Cr, is used as the visibility indicator value.

In the third calculation approach, the contrast ratio |Ba−Bb|/Ba or |Ba−Bb|/Bb is determined and used as the visibility indicator value. Instead, when a reference image, such as the reference image as in the second calculation method, is used, C1=|Ba−Bb| in the display image and C2=|Ba−Bb| in the reference image are determined, and the contrast ratio C1/C2 or C2/C1 is determined and used as the visibility indicator value.

In a fourth calculation approach, multidimensional histograms are generated to determine the visibility indicator.

In the first calculation approach, a one-dimensional histogram in each of the channels is used to analyze the visibility.

In the fourth calculation approach, multidimensional histograms are generated from the signals in the plurality of channels, and multidimensional autocorrelation or multidimensional cross-correlation operation is performed on the multidimensional histograms to determine the visibility indicator. The thus performed fourth calculation approach is likely to allow better simulation of contrast detection performed by the human eye. Better performance of the correlation operation may be provided in some cases by using 3D color histograms.

According to the above embodiment, the error detection circuit 150 determines histograms of the pixel values of the display image and performs correlation operation using the histograms. In the present embodiment, the histograms in the channels YCbCr shown in FIG. 10 correspond to the histograms of pixel values, and the correlation operation described with reference to FIG. 11 is performed on the histograms. The error detection circuit 150 determines an indicator representing the degree of dissimilarity between the foreground image, which is an image of a given area out of the display image, and the background image, which corresponds to the background of the foreground image out of the display image, based on the result of the correlation operation and performs the error detection based on the indicator. The indicator in this case is the visibility indicator.

The error detection in the display image can thus be performed based on the indicator indicating the degree of dissimilarity between the foreground image and the background image of the display image, instead of the error detection on a bit basis, such as CRC. When the foreground image has a high degree of dissimilarity to the background image, it is highly likely that the foreground image is visually distinguished from the background image, so that the foreground image is believed to have high visibility. That is, according to the present approach, the error detection circuit 150 can determine that an error has occurred when the foreground image has low visibility. For example, an icon or any other object that warns the user is displayed on an in-vehicle meter panel. According to the present embodiment, displaying such an icon is not terminated due, for example, to a 1-bit error, but the icon can be displayed to warn the user as long as possible when the visibility is ensured.

The image acquisition circuit 130 is an OSD circuit in FIG. 8, but not necessarily, and only needs to be a circuit that acquires an arbitrary display image. OSD is an abbreviation for on-screen display. The image acquisition circuit 130 will be described in detail in "5. Variations". The display image is an image generated or otherwise provided to be displayed on a display. In the embodiment described above, the display image is an image rendered by using OSD, but not necessarily, and may, for example, be an image generated by some kind of image processing, an image received over communication, or an image read from a memory.

The error detection is outputting the result of the error detection based on an indicator, for example, evaluating whether or not an error exists in the display image based on the indicator. The error detection may instead be outputting the indicator as the result of the error detection. For example, the greater the degree of dissimilarity between the foreground image and the background image, the greater the value of the indicator. In this case, it is determined that the display image contains an error when the indicator is smaller than a given value.

The foreground image is an image of an area of the display image that is the area where the degree of dissimilarity to the background image is desired to be determined based on an indicator. The area is the given area. For example, a mask image that specifies the foreground is stored, for example, in a memory. For example, pixels having the value of "1" in a 1-bit mask are the pixels that define the foreground, and the pixels that define the foreground identify the pixels of the foreground image. More specifically, a position on the display image that is the position to which the mask image that defines the foreground is applied is specified, and the foreground is identified from the thus specified position and the mask image.

The background image is a display image excluding the foreground image. That is, an error detection area including the foreground image is set in the display image, and the image of the error detection area excluding the foreground image is the background image. For example, pixels having the value of "0" in the 1-bit mask are the pixels that define the background, and the pixels that define the background identify the pixels of the background image.

The degree of dissimilarity refers to the degree of dissimilarity in each of the components that form the color space. The components that form the color space are also called channels. For example, in the YCbCr space, the degree of dissimilarity is a degree indicating the difference in brightness between the foreground image and the background image or the difference in color between the foreground image and the background image. On the other hand, in the RGB space, the degree of dissimilarity is a degree indicating the difference in color between the foreground image and the background image.

In the present embodiment, the error detection circuit 150 determines a histogram of each of the components that form the color space, as described with reference to FIG. 10. The error detection circuit 150 performs the autocorrelation operation on the histogram of each of the components to determine the distance at which the autocorrelation value peaks for each of the components and determines the indicator based on the largest distance (|Ba−Bb|) out of the determined distances, as described with reference to FIG. 11.

The indicator can thus be determined by the component having the largest difference between the foreground image and the background image out of the components that form the color space. Since the component having the largest difference between the foreground image and the background image is believed to also have the largest visual difference, the visibility of the foreground can be properly assessed by determining the indicator based on the component. The visibility in this case is the degree of dissimilarity to the background.

The indicator may be a value determined based on the largest distance |Ba−Bb|. For example, in the first calculation approach, the indicator is the largest distance |Ba−Bb| itself. Further, in the second calculation approach, the indicator is the contrast ratio based on the largest distance |Ba−Bb|. The contrast ratio is, for example, |Ba−Bb|/Ba.

In the present embodiment, the error detection circuit 150 determines as the histogram a first histogram of each of the components that form the color space from the display image and a second histogram of each of the components from the reference image corresponding to the foreground image, as described with reference to FIG. 13. The error detection circuit 150 performs the cross-correlation operation on the first histogram and the second histogram on a component basis and determines the indicator based on the peak value of the peak provided by the cross-correlation, as described with reference to FIG. 14.

Thus, even when the reference image contains two or more colors, an indicator indicating the degree of dissimilarity between the foreground image and the background image can be determined. That is, the histograms from the reference image have two or more peaks, and when the histograms from the display image contain the same pattern as that contained in the histograms from the reference image, the display image contains an image similar to the reference image at least in terms of the color or brightness pattern. In this case, since a large peak should occur in the result of the cross-correlation operation, the visibility of the foreground can be properly assessed by determining the indicator based on the peak value.

The reference image is the image corresponding to the foreground image on the assumption that the foreground image is correctly displayed in the display image. More specifically, the reference image is an image having at least the same histogram peak pattern as that of the foreground image. In this case, the relative positional relationship among the peaks only need to be the same between the reference image and the display image, as shown in FIG. 13, and the entire pattern may be shifted.

In the present embodiment, the error detection circuit 150 determines a second indicator that represents the degree of agreement between the foreground image and the reference image based on the pixel values of the display image and the pixel values of the reference image, which serves as a reference for the foreground image, or the edge of the display image and the edge of the reference image. The error detection is performed based on the indicator and the second indicator. In the present embodiment, the indicator is the visibility indicator, and the second indicator is the shape indicator.

The error detection in the display image can thus be performed by combining two indicators assessed about different characteristics with each other. That is, the error detection in the display image can be performed with higher accuracy by combining the indicator representing the degree of dissimilarity in brightness or color between the foreground image and the reference image with the second indicator representing the degree of shape agreement between the foreground image and the reference image. The second indicator will be described later in detail.

In the present embodiment, the image acquisition circuit 130 generates the display image by overlaying a second image on a given area of a first image. The background image is the image corresponding to the first image out of the display image. In the present embodiment, the input image corresponds to the first image, and the reference image corresponds to the second image.

The display image can thus be generated by using OSD to overlay an icon, letters, or any other object on the input image. In this case, the overlaid letters or icon corresponds to the foreground image, and the rest of the original input image corresponds to the background image. In the present embodiment, when the error detection is performed on the thus generated display image, it can be determined that an error has occurred when the icon or letters are not properly overlaid by using OSD so that the icon or letters are not visually recognized by the user. On the other hand, even when a processing error corresponding to about one bit occurs in the overlay operation but the visibility can be ensured, it is not determined that an error has occurred, whereby the icon or letters can be presented to the user.

The present embodiment can be implemented as an error detection method described below. That is, the method includes determining histograms of the pixel values of the display image, performing the correlation operation using the histograms, determining an indicator representing the degree of dissimilarity between the foreground image, which is an image of the given area of the display image, and the background image, which corresponds to the background of the foreground image out of the display image, based on the result of the correlation operation, and then performing the error detection on the display image based on the indicator.

The present embodiment can further be implemented as an error detection method described below. That is, the method includes analyzing the error detection area of the display image and calculating an indicator representing the visibility of the foreground against the background. In this method, the reference image may be used as a mask to identify the foreground. The indicator is calculated by using a technique described in (a) or (b) below. (a) The histograms from the display image are used to search for the separation between foreground and background. (b) The contrast ratio between the foreground and background is calculated.

4.3. First Approach for Calculating Shape Indicator

The shape indicator is an indicator representing whether the shape of an image contained in the error detection area agrees with the shape of the reference image or not. The approach for calculating the shape indicator will be described below.

First, pixel blocks in the error detection area of the display image are so averaged that the final averaged image has m×n pixels. The subsampling described above is performed to prevent a small number of pixel errors from being detected as significant errors, and the overall shape of the reference image and the display image is checked with the errors, such as color shift or small distortion, ignored. The resolution of the subsampled image can be increased to achieve an exact agreement. The value of m×n can be selected in accordance with the application. When used in relation to the reference image, as will be described below, the value of m×n is selected based on sample data observation.

When the error detection area of the display image has u×v pixels, the averaged block size is u/m×v/n pixels. When no reference background information is available, the pixels in a portion of the display image that is the portion where no reference pixels exist are deleted. The deletion corresponds to reference foreground masking. The deletion is performed because it is necessary to baseline the background pixels in the reference image and the display image. Baselining the background pixels means aligning the background pixels with one another or putting the background pixels under the same conditions. To this end, the value of the background pixels is set at the same value in both the display image and the reference image.

Figure 15:
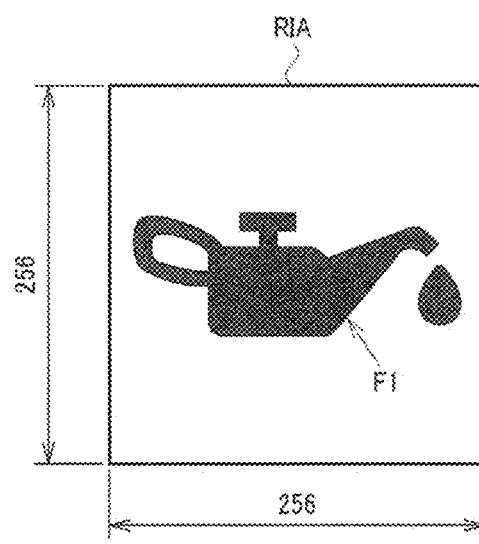
FIG. 15 shows an example of the reference image.
Figure 16:
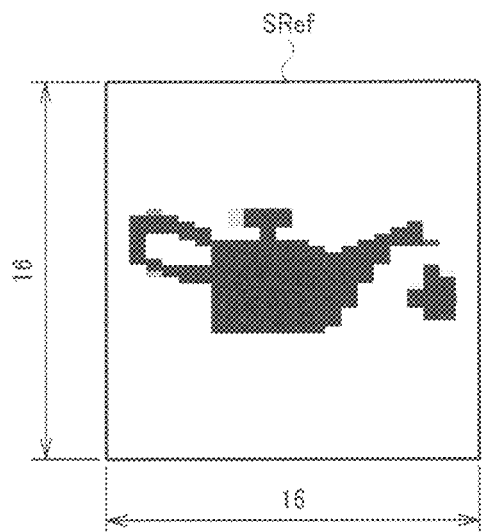
FIG. 16 shows an averaged image of the reference image.

The reference image is also so averaged as to have m×n pixels. The averaging is performed separately on a channel basis. FIG. 15 shows an example of the reference image. A foreground F1 of a reference image RIA is an icon and is colored. The background is the area excluding the icon and is colorless, for example, drawn in black. In FIG. 15, the reference image RIA has a size of 256×256 pixels. FIG. 16 shows an averaged image of the reference image. In FIG. 16, m=n=16, and an averaged image SRef has a size of 16×16 pixels. Since the reference image and the averaged image thereof each have a colorless background, the background of the error detection area of the display image is also converted into a colorless background, and the averaged image of the thus converted error detection area is determined.

The averaged image SRef of the reference image and an averaged image SAnz of the error detection area of the display image are then compared with each other on a pixel basis by using a distance reference to determine a distance D as shown in Expression (2) below. The images SRef and SAnz each have m×n pixels. The distance D is a three-dimensional distance. In the present embodiment, the distance reference is the square of a Cartesian distance, and any other distance reference can provide a similar parameter.

$$D = \sum_{c=1}^{3}\sum_{y=1}^{n}\sum_{x=1}^{m}([R_{xyc} - R'_c] - [A_{xyc} - A'_c])^2 \quad (2)$$

The parameter c represents a channel, the parameter x represents a pixel position in the widthwise direction in the averaged image, and the parameter y represents a pixel position in the lengthwise direction in the averaged image. The widthwise direction is the horizontal direction, and the lengthwise direction is the vertical direction. The parameters m and n represent the sizes of the averaged image. The parameter $R_{xyc}$ represents a pixel value of the averaged image of the reference image in the channel c that is the value of the pixel located in the position (x, y). The parameter $R'_c$ represents the average of the pixels $R_{xy}$ in the channel c. The average is $R_{xyc}$ averaged in the averaged image. The parameter $A_{xyc}$ represents the pixel value of the averaged image of the display image in the channel c that is the value of the pixel located in the position (x, y). The parameter $A'_c$ represents the average of the pixels $A_{xy}$ in the channel c. The average is $A_{xyc}$ averaged in the averaged image.

The reason for subtracting the average in each of the channels is to ensure that a small color shift that occurs between the reference image and the display image is not treated as an error. When an exact agreement is required, the average can be set at zero. In this case, the distance reference is used to check the agreement in terms of shape and color.

The display image is, for example, the image shown in FIG. 12. An error detection area A1 is so extracted as to surround the area where the reference image is combined with the input image. In FIG. 12, the error detection area is drawn in the form of a dotted quadrangle.

A shape indicator S is derived from the distance parameter in accordance with Expressions (3) and (4) below. The parameter S is also called a shape parameter. The parameter T is a threshold and can be an arbitrary value. When D<T is satisfied, T/D=1 is achieved, so that the shape indicator S does not change.

$$S = f\left(\frac{T}{D}\right) \quad (3)$$

$$D = T ただし, D < T \quad (4)$$

The function f is so chosen as to be readily implemented in hardware. For example, the function f may be a scaling function K, which scales the range from 0 to 1 into a range from 0 to k. In the examples described below, the function f is a unit function. That is, S=T/D. The shape indicator S indicates the degree of shape agreement between the reference image and the display image. When the images do not agree with each other, the degree of shape agreement decreases and tends to become zero. An example of the situation described above will be described below.

In FIG. 12, the icon of the reference image is correctly displayed in the display image. In this case, the shape indicator is S=1. FIG. 12 shows "Shape: 1.000".

Figure 17:
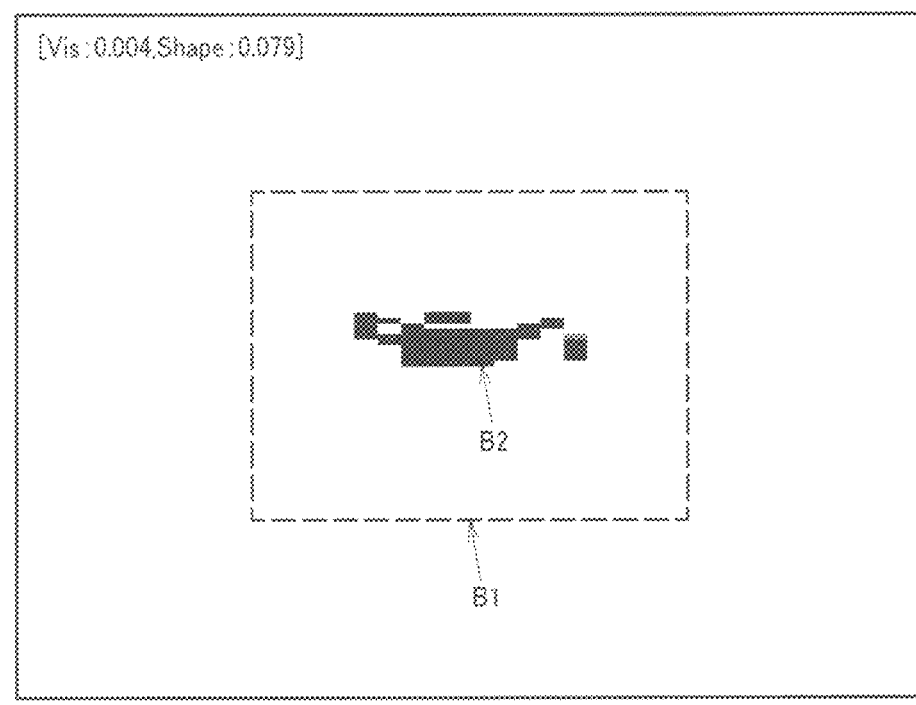
FIG. 17 shows a second example of the display image.

FIG. 17 shows a second example of the display image. B1 represents the error detection area. The icon of the reference image is obscure in the display image, as indicated by B2 of FIG. 17. That is, some of the reference pixels are not present in the display image, and when the function f is a unit function, the shape indicator S is smaller than one. In the case of such an obscure foreground, both the visibility indicator and the shape indicator are small values.

Figure 18:
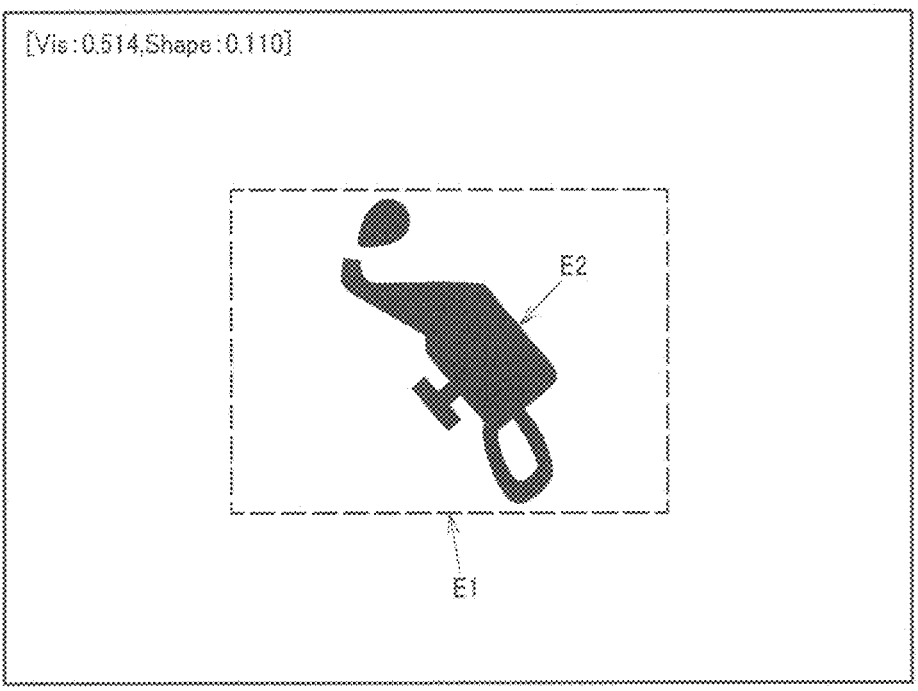
FIG. 18 shows a third example of the display image.

FIG. 18 shows a third example of the display image. E1 represents the error detection area. The icon of the reference image is rotated in the display image, as indicated by E2 of FIG. 18. In this example, since the shape is rotated from the reference, the shape indicator S is smaller than one when the function f is a unit function. When the foreground is rotated as described above, the visibility indicator has a relatively large value, and the shape indicator has a relatively small value. Combining the visibility indicator and the shape indicator as described above allows appropriate error detection in a variety of states of the foreground, whereby the accuracy of the error detection can be improved.

The above description has been made of the case where the display image and the reference image are each available as an image, but the present disclosure is not necessarily applied to the case described above. For example, the same operation can be readily performed on a case where images are delivered in the form of streaming lines, pixels, or sub-images.

The shape indicator described above is used to check only the agreement in terms of a base signal. For low visibility images, an edge detection kernel can be convolved with the error detection area of the display image and the reference image to generate a primary gradient image, and then a parameter can be determined by an shape operation algorithm. The edge detection kernel is, for example, a Laplacian or Sobel kernel. The determined parameter allows removal of false detection made by the shape indicator. A correct error detection result can thus be produced also in the case of a low-visibility image.

4.4. Second Calculation Approach for Calculating Shape Indicator

Figure 19:
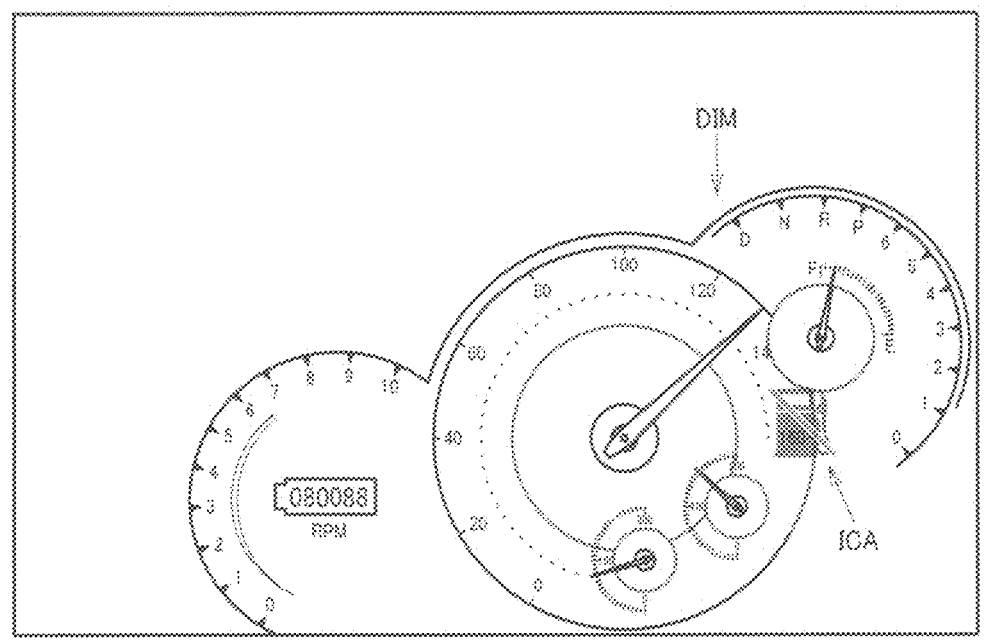
FIG. 19 shows a fourth example of the display image.
Figure 20:
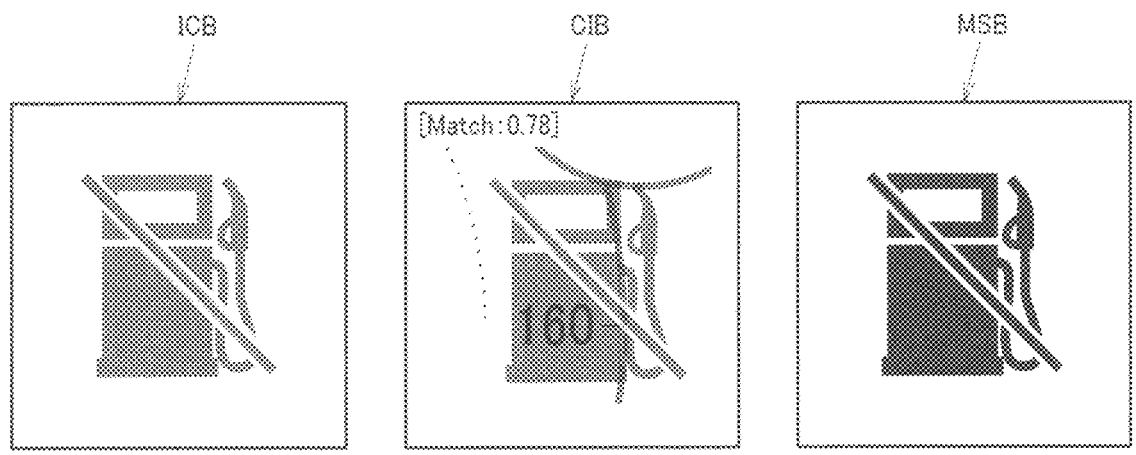
FIG. 20 shows a first example of the reference image, the display image, and a mask image.

FIG. 19 shows a fourth example of the display image. FIG. 19 shows an example in which an icon ICA is overlaid on a dashboard image DIM. The foreground and background of the icon image are separated from each other and blended with the dashboard image based on a parameter alpha. In the case described above, the foreground of the icon image is partially blended with the dashboard image, while the background of the icon image is fully blended with the dashboard image. The foreground of the icon image is the icon portion of the icon image. In FIG. 20, the icon portion is shown in the form of a black portion and formed of pixels of a mask image MSB that have the bit of "1". The background of the icon image is the non-icon portion of the icon image. In FIG. 20, the non-icon portion is drawn in white and formed of the mask image MSB that has the bit of "0". The background of the icon image is so formed that the icon image and the dashboard image DIM are blended with each other at a blending ratio of 0:1. The foreground of the icon image is so formed that the icon image and the dashboard image DIM are blended with each other at a blending ratio of $\alpha:(1-\alpha)$, where $0<\alpha<1$. The icon blended at the proportion a forms the foreground in the display image, and the rest of the area forms the background in the display image.

In the present embodiment, the relationship between the icon and an original icon is analyzed, and whether the icon is correctly displayed is checked. Specifically, an edge detection technology, such as a Sobel edge detection convolution operator, is used to detect an edge in the error detection area in the same manner in accordance with which an edge of the reference is detected.

FIG. 20 shows a first example of the error detection area and the mask image of the reference image and the display image. The mask image MSB is a mask showing the foreground and background of a reference image ICB and formed of black foreground pixels and white background pixels. The reference image ICB, which is a reference icon, is an image having a colored foreground, which is the icon. A display image CIB, which is a display icon, is an image of the error detection area that the dashboard image DIM blended with the reference image ICB. In the icon portion, the dashboard image DIM is visible through the blended icon portion.

Figure 21:
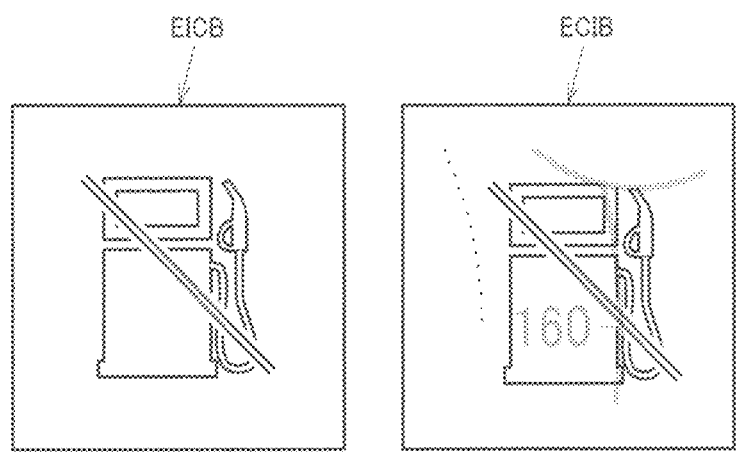
FIG. 21 shows an example of edge values calculated from the reference image and the display image in the first example.

FIG. 21 shows an example of edge values calculated from the reference image and the display image. EICB represents an edge image of the reference image ICB, and ECIB represents an edge image of the display image CIB. For the sake of illustration, the edges are drawn with black lines and gray lines, and the strength of the edges can in practice be expressed in grayscales. White represents high intensity edges, and black represents no edges. The edge detection is performed on brightness channels. Similarly, the edge detection is performed on color channels or in a color space, such as YCbCr.

Edges in foreground and background areas are calculated for the reference image and the display image, and the shape indicator is calculated by calculating similarity quantities, as shown in Expressions (5) to (16) below. The parameter Match in Expression (16) below is the shape indicator. It is assumed in the following description that the reference image has the size of m×n pixels, and the error detection area of the display image also has the size of m×n pixels.

Expression (5) below shows a horizontal Sobel kernel. The horizontal Sobel kernel is a Sobel filter operator that detects horizontal edges. Expression (6) below shows a vertical Sobel kernel. The vertical Sobel kernel is a Sobel filter operator that detects vertical edges.

$$F_H = \begin{bmatrix} 1 & 0 & -1 \\ 2 & 0 & -2 \\ 1 & 0 & -1 \end{bmatrix} \tag{5}$$

$$F_V = \begin{bmatrix} 1 & 2 & 1 \\ 0 & 0 & 0 \\ -1 & -2 & -1 \end{bmatrix} \tag{6}$$

The edge values are calculated in each pixel position in the reference image and the error detection area of the display image, as shown in Expressions (7) to (12) below. The symbol "*" represents the convolution operator. The parameter N is a normalization coefficient for keeping a value between 0 and 1 and set at four in the description. The parameter IRef represents the brightness channel of the reference image. The parameter $IRef_{(x, y)}$ represents the pixel in the position (x, y) of the brightness channel of the reference image. The parameter x is an integer that satisfies $0<x\leq m$, and y is an integer that satisfies $0<y\leq n$. The parameter IRen represents the brightness channel of the display image in the error detection area. The parameter $IRen_{(x, y)}$ represents 3×3 pixels around the position (x, y) of the brightness channel of the display image in the error detection area.

$$E1_{(x,y)} = \frac{\begin{bmatrix} E1_H \\ E1_V \end{bmatrix}_{(x,y)}}{N} \tag{7}$$

$$E1_{H(x,y)} = F_H * IRef_{(x,y)} \tag{8}$$

$$E1_{V(x,y)} = F_V * IRef_{(x,y)} \tag{9}$$

$$E2_{(x,y)} = \frac{\begin{bmatrix} E2_H \\ E2_V \end{bmatrix}_{(x,y)}}{N} \tag{10}$$

$$E2_{H(x,y)} = F_H * IRen_{(x,y)} \tag{11}$$

$$E2_{V(x,y)} = F_V * IRen_{(x,y)} \tag{12}$$

The shape indicator Match is determined from the above edge values, as shown in Expressions (13) to (16) below. The shape indicator Match is also called a fitting value. The symbol "·" represents the inner product operator.

$$S = \sum_{y=0}^{n}\sum_{x=0}^{m} E1_{(x,y)} \cdot E2_{(x,y)} \tag{13}$$

$$T1 = \sum_{y=0}^{n}\sum_{x=0}^{m} E1_{(x,y)} \cdot E1_{(x,y)} \tag{14}$$

$$T2 = \sum_{y=0}^{n}\sum_{x=0}^{m} E2_{(x,y)} \cdot E2_{(x,y)} \tag{15}$$

$$Match = \frac{S}{(T1+T2)/2} \tag{16}$$

When the above operation is applied to FIGS. 20 and 21, Match=0.78 is achieved.

When it is required to calculate the fitting value without analysis of the background, the calculation shown in Expressions (17) to (22) below is used.

$$E1^f_{(x,y)} = E1_{(x,y)} M_{(x,y)} \tag{17}$$

$$E2^f_{(x,y)} = E2_{(x,y)} M_{(x,y)} \tag{18}$$

-continued $$S^f = \sum_{y=0}^{n}\sum_{x=0}^{m} E1^f_{(x,y)} \cdot E2^f_{(x,y)} \quad (19)$$

$$T1^f = \sum_{y=0}^{n}\sum_{x=0}^{m} E1^f_{(x,y)} \cdot E1^f_{(x,y)} \quad (20)$$

$$T2^f = \sum_{y=0}^{n}\sum_{x=0}^{m} E2^f_{(x,y)} \cdot E2^f_{(x,y)} \quad (21)$$

$$\text{Match} = \frac{S^f}{(T1^f + T2^f)/2} \quad (22)$$

$M_{(x,y)}$ means a mask pixel that defines which pixel belongs to the background and which pixel belongs to the foreground. The mask can be achieved by a simple 1-bit mask that defines the background with 0 and the foreground with 1. The mask may instead be a mask that has one or more bits and support anti-aliased edges. In the mask, values between and 1 are handled as partial backgrounds and partial foregrounds. For example, a value of 0.25, which is "01" in 2-bit notation, means a 25% foreground and a 75% background.

Figure 22:
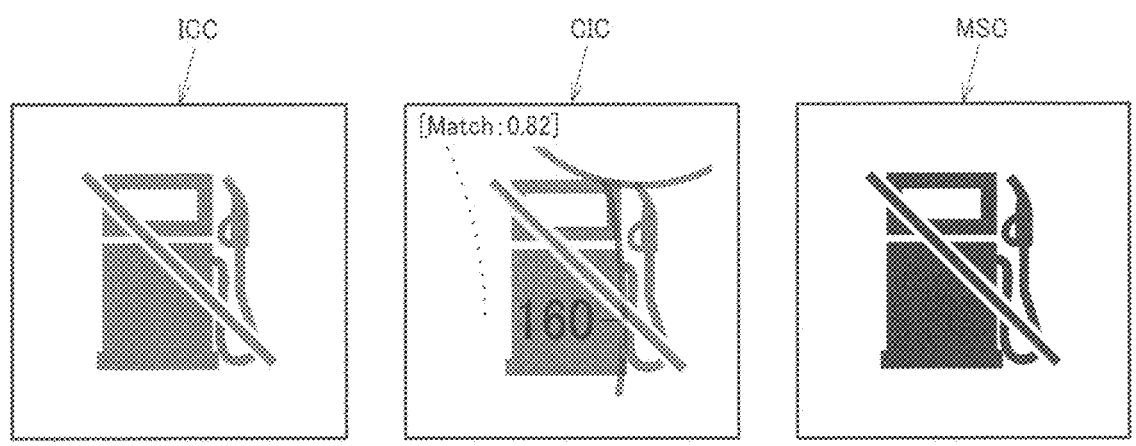
FIG. 22 shows a second example of the reference image, the display image, and the mask image.
Figure 23:
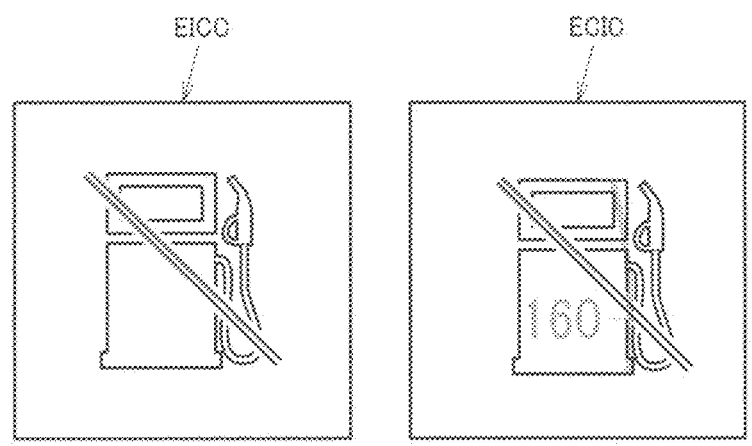
FIG. 23 shows an example of the edge values calculated from the reference image and the display image in the second example.

FIG. 22 shows a second example of the reference image, the error detection area of the display image, and the mask image. A reference image ICC, a display image CIC, and a mask image MSC are the same as the reference image ICB, the display image CIB, and the mask image MSB in FIG. 20. FIG. 23 is an example of the edge values calculated from the reference image and the display image. EICC represents an edge image of the reference image ICC, and ECIC represents an edge image of the display image CIC. In the edge image ECIC of the display image, the edge components of the background of the icon are masked by $M_{(x,y)}$. The above operation increases the shape indicator Match to 0.82, as shown in FIG. 22.

According to the embodiment described above, the error detection circuit 150 determines an indicator representing the degree of agreement between the foreground image, which is an image of a given area of the display image, and the reference image based on the pixel values of the display image and the pixel values of the reference image, which serves as a reference for the foreground image, or based on the pixel values of the edge image of the display image and the pixel values of the edge image of the reference image, and the error detection circuit 150 then performs the error detection on the display image based on the indicator. The pixel values of an edge image correspond to an edge quantity. The indicator in the description is the shape indicator.

The error detection in the display image can thus be performed based on the indicator indicating the degree of agreement between the foreground image of the display image and the reference image, instead of error detection on a bit basis, such as CRC. When the foreground image has a high degree of agreement with the reference image, it is highly likely that the shape of the foreground image looks visually the same as that of the reference image. That is, according to the present approach, the error detection circuit 150 can determine that an error has occurred when the shape of the foreground image is not correctly displayed. For example, an icon or any other object that warns the user is displayed on an in-vehicle meter panel. According to the present embodiment, displaying such an icon is not terminated due, for example, to a 1-bit error, but the icon can be displayed to warn the user as long as possible when the shape of the icon can be correctly recognized.

The first calculation approach presented by Expressions (3) to (5) described above corresponds to the case where the indicator S is determined based on the pixel values of the display image and the pixel values of the reference image, which serves as a reference for the foreground image. The second calculation approach presented by Expressions (5) to (22) described above corresponds to the case where the indicator Match is determined based on the pixel values of the edge image of the display image and the pixel values of the edge image of the reference image. The pixel values of the edge images correspond to the edge quantity expressed by Expressions (7), (10), (17), and (18) described above.

The degree of agreement refers, for example, to the degree of agreement in terms of the shape of an icon or any other object. More specifically, the degree of agreement refers to the degree of agreement in terms of the contour and orientation of the icon or any other object. The icon or any other object may, for example, be an icon, letters, a figure, or a mark. Further, the degree of agreement may include the degree of agreement in terms of the state of the portion inside the contour of the icon or any other object. The state is, for example, whether the interior of the icon or any other object is filled or not. For example, the indicator indicating the degree of agreement increases as the degree of agreement between the foreground image and the background image increases.

In the present embodiment, the error detection circuit 150 performs the subsampling, which reduces the number of pixels or resolution of the display image and the reference image, as described in FIG. 16. The error detection circuit 150 determines distance information representing the distance in the color space between the pixel values of the subsampled display image and the pixel values of the subsampled reference image, as described with reference to Expression (2) described above. The error detection circuit 150 determines the indicator from the distance information described above, as described with reference to Expressions (3) and (4) described above.

Since the subsampling averages the pixel values, the effect of noise, such as a 1-bit error, can be reduced when the indicator is determined. The noise in this case is a minor error that does not affect the shape. The distance in the color space between the pixel values of the display image and the pixel values of the reference image should be small when the shapes in the display image and the reference image agree with each other. The degree of agreement between the shapes can therefore be properly assessed by using the distance in the color space.

In the present embodiment, the error detection circuit 150 determines the indicator from the value resulting from the division of a given threshold by the distance information. In Expressions (3) and (4) described above, T is the given threshold, D is the distance information, and S is the indicator.

The higher the degree of agreement between the shapes, the smaller the distance, whereby dividing a given threshold by the distance information allows determination of the indicator in such a way that the greater the degree of agreement between the shapes, the greater the value of the indicator.

In the present embodiment, the error detection circuit 150 performs product-sum operation between the pixel values of the edge image of the display image and the pixel values of the edge image of the reference image and determines the indicator from the result of the product-sum operation, as described with reference to Expressions (13) and (16) described above.

An edge image is an image in which the edge quantity is defined as the pixel value of each pixel. When the shapes in the display image and the reference image agree with each other, the edge image of the display image and the edge image of the reference image should have approximately the same edge quantity at the same pixel. Conversely, when the shapes do not agree with each other, the edge positions do not agree with each other between the display image and the reference image. Therefore, for example, even when the edge image of the display image has a large edge quantity, the same pixel in the edge image of the reference image may have a zero edge quantity. The product-sum operation performed on the edge quantities at the same pixel therefore results in a large value when the shapes agree with each other and results in a small value when the shapes do not agree with each other. Performing the product-sum operation on the edge quantities therefore allows proper assessment of the degree of agreement between the shapes.

The "product" provided by the product-sum operation is the inner product of vectors in Expression (13) above, but not necessarily. For example, when the edge quantity is defined by a scalar, the "product" is the product of two scalars.

In the present embodiment, the error detection circuit 150 masks an area of the edge image of the display image that is the area corresponding to the background image and performs the product-sum operation using the masked edge image of the display image, as described with reference to Expressions (18) and (19) described above.

In this way, even when the background contains edges, the edge quantity product-sum operation can be performed with the edges masked. That is, the degree of agreement between the edges of the display image and the reference image can be assessed without being affected by the edges of the background, whereby the accuracy of the error detection can be further improved.

The present embodiment can further be implemented as an error detection method described below. That is, the method determines an indicator representing the degree of agreement between the foreground image, which is an image of a given area of the display image, and the reference image, based on the pixel values of the display image and the pixel values of the reference image, which serves as a reference for the foreground image, or based on the pixel values of the edge image of the display image and the pixel values of the edge image of the reference image, and the method then performs the error detection in the display image based on the indicator.

The present embodiment can still further be implemented as an error detection method described below. That is, the method includes analyzing the error detection area of the display image and calculating an indicator indicating the similarity to the reference image. The indicator is calculated by using a technique described in (a) or (b) below. (a) A three-dimensional distance error of the subsampled pixels associated with the display image is compared with that of the reference image. (b) The three-dimensional distance error associated with the edges of the display image is compared with that of the reference image.

5. Variations

An icon display status may be inputted to the circuit apparatus 100 from a system, such as the processing apparatus 200 shown in FIG. 8. The icon display status is, for example, the status indicating whether or not an icon is being displayed or which icon is being displayed. The circuit apparatus 100 can thus detect that an icon of different type from an icon that the system intended to display is displayed, or that the system intended to display an icon but the icon is not displayed, or that the system did not intend to display an icon but the icon is actually displayed.

The above embodiment has been described with reference to the case where the error detection method according to the present disclosure is applied to a display controller, but a target to which the present disclosure is applied is not limited to the case described above. That is, the present disclosure is applicable at any stage of the path along which the display image is processed or transferred.

For example, the display driver that drives the display panel may be a circuit apparatus to which the present disclosure is applied. In this case, for example, an interface via which image data is inputted to the display driver corresponds to an image acquisition circuit, and an error detection circuit is provided between the interface and a drive circuit. For example, the error detection circuit does not perform the overlay operation or any other similar operation but performs the error detection according to the present disclosure on a given area, such as an icon, in an image received via the interface.

The above embodiment has been described with reference to the case where the image acquisition circuit 130 generates a display image by overlaying an icon on an input image inputted to and preprocessed by the display controller, but a target to which the present disclosure is applied is not limited to the case described above. That is, the image acquisition circuit 130 can acquire an arbitrary image as the display image.

For example, the image acquisition circuit 130 may use the input image itself as the display image. In this case, the input image already contains, for example, an icon, and the area containing the icon or any other object is set as the error detection area.

The image acquisition circuit 130 may instead use a scaled input image as the display image. In this case, the input image already contains, for example, an icon, and the area containing the scaled icon is set as the error detection area.

The image acquisition circuit 130 may instead use an input image having undergone gamma conversion as the display image. In this case, the input image already contains, for example, an icon, the icon undergoes gamma conversion, and the area containing the icon having undergone gamma conversion is set as the error detection area.

The image acquisition circuit 130 may instead use a deformed input image as the display image. In this case, the input image already contains, for example, an icon, the icon or the entire input image is deformed, and the area containing the deformed icon is set as the error detection area. For example, an image is deformed in some cases to be displayed, for example, on a head-mounted display.

Instead, the image acquisition circuit 130 may read an image stored in a memory and use the image as the display image. In this case, a memory controller corresponds to the image acquisition circuit 130. The image acquisition circuit 130 may instead use an image received via an interface as the display image. In this case, the interface corresponds to the image acquisition circuit 130.

6. Electronic Instrument

Figure 24:
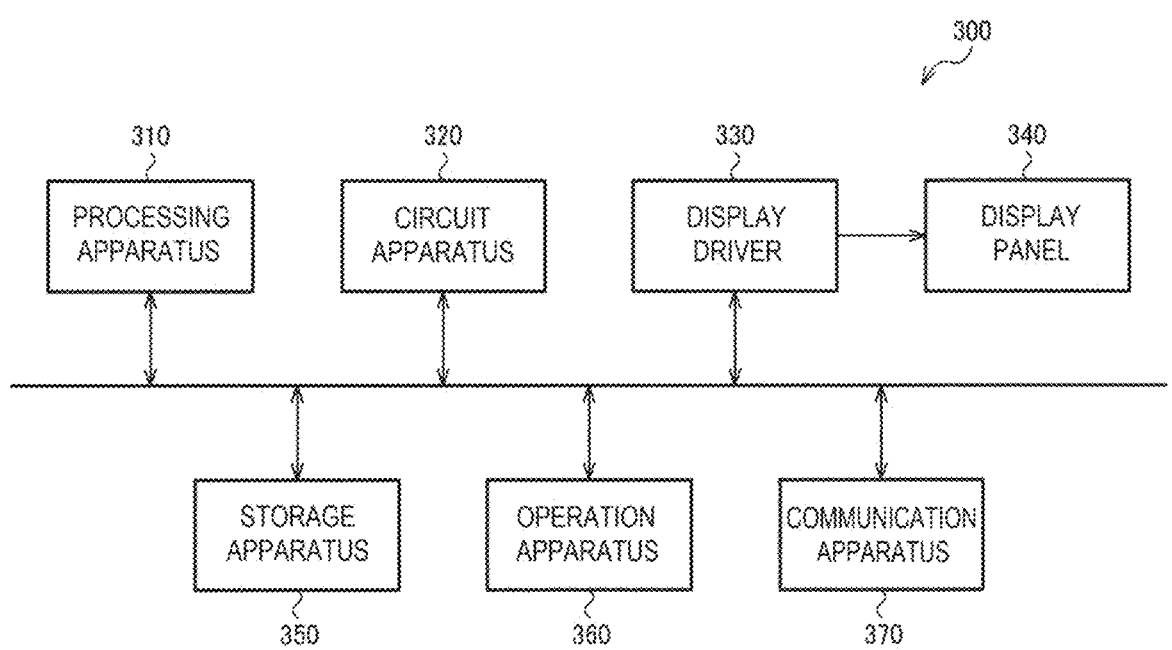
FIG. 24 shows an example of the configuration of an electronic instrument.

FIG. 24 shows an example of the configuration of an electronic instrument including the circuit apparatus according to the present embodiment. An electronic instrument 300 includes a processing apparatus 310, a circuit apparatus 320, a display driver 330, a display panel 340, a storage apparatus 350, an operation apparatus 360, and a communication apparatus 370. The processing apparatus 310 is, for example, an MCU. The circuit apparatus 320 is, for example, a ICON.

The processing apparatus 310 transfers image data stored in the storage apparatus 350 or received via the communication apparatus 370 to the circuit apparatus 320. The circuit apparatus 320 performs image processing on the image data, display timing control, error detection in the image data to be transferred to the display driver, and other types of processing. The display driver 330 drives the display panel 340 to cause it to display an image based on the image data transferred from the circuit apparatus 320 and the display timing control performed by the circuit apparatus 320. The display panel 340 is, for example, a liquid crystal display panel or an EL display panel. The storage apparatus 350 is, for example, a memory, a hard disk drive, or an optical disk drive. The operation apparatus 360 is an apparatus that allows the user to operate the electronic instrument 300 and is formed, for example, of buttons, a touch panel, or a keyboard. The communication apparatus 370 is, for example, an apparatus that performs wired communication or an apparatus that performs wireless communication. The wired communication is, for example, LAN-based or USB-based communication. The wireless communication is, for example, WiFi-based and Bluetooth-based (registered trademark) communication.

The electronic instrument that includes this circuit apparatus according to the present embodiment can be assumed to be any of a variety of instruments, such as an in-vehicle electronic instrument, a display terminal, such as factory facilities, a display apparatus incorporated in a robot, an information processing apparatus, and a portable information processing terminal. The in-vehicle electronic instrument is, for example, a meter panel. The configuration of the electronic instrument is not limited to that shown in FIG. 24, and any of a variety of other configurations can be employed in accordance with the application. For example, in an in-vehicle electronic instrument, the circuit apparatus 320, the display driver 330, the display panel 340, and the operation apparatus 360 are built in a meter panel, and the processing apparatus 310, the storage apparatus 350, and the communication apparatus 370 are built in an ECU. In this case, the meter panel corresponds to an electronic instrument including the circuit apparatus according to the present embodiment. ECU is an abbreviation for an electronic control unit.

The circuit apparatus according to the present embodiment described above includes an image acquisition circuit that acquires the display image, an error detection circuit, and a search circuit. The error detection circuit determines histograms of the pixel values of the display image, performs correlation operation using the histograms, determines an indicator representing the degree of dissimilarity between the foreground image, which is an image of a given area of the display image, and the background image, which corresponds to the background of the foreground image out of the display image, based on the result of the correlation operation, and performs error detection on the display image based on the indicator. The search circuit searches the display image for the display position of the foreground image based on the reference image, which serves as a reference for the foreground image. The error detection circuit performs the error detection based on the display position searched for by the search circuit.

The present embodiment allows proper detection of an error likely to be misrecognized by the user. That is, when the foreground image has a high degree of dissimilarity to the background image, it is highly likely that the foreground image is visually distinguished from the background image, whereby using the indicator described above allows the error detection circuit to determine that an error has occurred when the foreground image has low visibility. In this case, the error detection circuit can perform the error detection based on the display position searched for by the search circuit and can therefore perform the error detection even when the display position of the foreground image is not determined in advance. The aforementioned series of processes for the error detection are not disclosed in JP-A-2012-35677 or other related technologies.

Further, in the present embodiment, the error detection circuit may perform the error detection when the search circuit detects the display position in the search operation and may not perform the error detection when the search circuit does not detect the display position in the search operation.

According to the present embodiment, the error detection is performed when the foreground image is contained in the display image, and the error detection is not performed when the foreground image is not contained in the display image. For example, when frame images of a video are inputted as the display image, the error detection circuit performs the error detection on an icon or any other object when the icon or any other object is displayed in the video and does not perform the error detection when the icon or any other object is not displayed in the video. The technology that allows the image search and the error detection to be performed as a series of processes is not disclosed in JP-A-2012-35677 or other related technologies.

In the present embodiment, the search circuit may determine the cross-correlation between the display image and the reference image and evaluate whether or not the cross-correlation has a correlation value greater than a detection threshold. When the cross-correlation has a correlation value greater than the detection threshold, the search circuit may detect the position corresponding to the correlation value greater than the detection threshold as the display position, and when the cross-correlation has no correlation value greater than the detection threshold, the search circuit may detect no display position.

According to the present embodiment, the search circuit can detect a position where the degree of correlation between the display image and the reference image is large as the display position of the foreground image. A series of actions can then be achieved as follows: When the search circuit can detect the display position, the error detection circuit performs the error detection; and when the search circuit cannot detect the display position, the error detection circuit does not perform the error detection.

In the present embodiment, the search circuit may divide the display image into a plurality of band-shaped areas, divide each of the plurality of band-shaped areas into a plurality of individual areas, and search each of the plurality of individual areas.

According to the present embodiment, the cross-correlation between each of the individual areas and the reference image is calculated, and the cross-correlations calculated for the individual areas can be combined with one another to acquire the cross-correlation between the display image and the reference image. Further, the parallel calculation of the cross-correlations between the individual areas and the reference image can improve the searching speed. For example, when the error detection is performed on a video, it is desirable that the delay that occurs before the error detection is completed is small, and improvement in the processing speed of the cross-correlation accelerates the error detection.

In the present embodiment, the search circuit may perform the search operation by calculating the cross-correlation between the display image and the reference image using Fourier transform and inverse Fourier transform.

According to the present embodiment, the cross-correlation is provided by multiplying the Fourier transformed display image by the Fourier transformed reference image in the frequency domain and then performing inverse Fourier transform on the result of the multiplication. The processing speed of the Fourier transform and inverse Fourier transform can be improved by performing the Fourier transform and inverse Fourier transform on an individual area basis.

In the present embodiment, the error detection circuit may determine a histogram of each of the components that form the color space, perform the autocorrelation operation on the histogram of each of the components to determine the distance at which the autocorrelation value peaks for each of the components, and determine the indicator based on the largest distance out of the determined distances.

The indicator can thus be determined by the component having the largest difference between the foreground image and the background image out of the components that form the color space. Since the component having the largest difference between the foreground image and the background image is believed to also have the largest visual difference, the degree of dissimilarity between the foreground and the background can be properly assessed by determining the indicator based on the component.

In the present embodiment, the error detection circuit may determine as the histogram a first histogram of each of the components that form the color space from the display image and a second histogram of each of the components from the reference image, perform the cross-correlation operation on the first histogram and the second histogram on a component basis, and determine the indicator based on the peak value of the peak provided by the cross-correlation.

When the histograms from the display image contain the same pattern as that contained in the histograms from the reference image, the display image contains an image similar to the reference image at least in terms of the color or brightness pattern. In this case, since a large peak should occur in the result of the cross-correlation operation, the dissimilarity between the foreground and the background can be properly assessed by determining the indicator based on the peak value.

In the present embodiment, the error detection circuit may determine a second indicator representing the degree of agreement between the foreground image, which is an image of a given area of the display image, and the reference image based on the pixel values of the display image and the pixel values of the reference image or the pixel values of the edge image of the display image and the pixel values of the edge image of the reference image, and the error detection circuit may then perform the error detection based on the indicator and the second indicator.

In this way, the error detection in the display image can be performed with higher accuracy by combining the indicator representing the degree of dissimilarity in brightness or color between the foreground image and the reference image with the second indicator representing the degree of shape agreement between the foreground image and the reference image.

In the present embodiment, the image acquisition circuit may generate the display image by overlaying the second image on a given area of the first image, and the background image may be the image corresponding to the first image out of the display image.

The display image can thus be generated, for example, by overlaying an icon, letters, or any other object on the input image. In this case, the overlaid letters or icon corresponds to the foreground image, and the rest of the original input image corresponds to the background image. According to an aspect of the present disclosure, when the error detection is performed on the thus generated display image, it can be determined that an error has occurred when the icon or letters are not properly overlaid so that the icon or letters cannot be recognized by the user.

The circuit apparatus according to the present embodiment includes an image acquisition circuit that acquires the display image, an error detection circuit, and a search circuit. The error detection circuit determines an indicator representing the degree of agreement between the foreground image, which is an image of a given area of the display image, and the reference image based on the pixel values of the display image and the pixel values of the reference image, which serves as a reference for the foreground image, or based on the pixel values of the edge image of the display image and the pixel values of the edge image of the reference image, and the error detection circuit then performs the error detection on the display image based on the indicator. The search circuit searches the display image for the display position of the foreground image based on the reference image. The error detection circuit performs the error detection based on the display position searched for by the search circuit.

The present embodiment allows proper detection of an error likely to be misrecognized by the user. That is, when the foreground image has a high degree of agreement with the reference image, it is highly likely that the shape of the foreground image looks visually the same as that of the reference image, whereby using the indicator described above allows the error detection circuit to determine that an error has occurred when the shape of the foreground image is not correctly displayed. In this case, the error detection circuit can perform the error detection based on the display position searched for by the search circuit and can therefore perform the error detection even when the display position of the foreground image is not determined in advance. The aforementioned series of processes for the error detection are not disclosed in JP-A-2012-35677 or other related technologies.

Further, in the present embodiment, the error detection circuit may perform the error detection when the search circuit detects the display position in the search operation and may not perform the error detection when the search circuit does not detect the display position in the search operation.

According to the present embodiment, the error detection is performed when the foreground image is contained in the display image, and the error detection is not performed when the foreground image is not contained in the display image. For example, when frame images of a video are inputted as the display image, the error detection circuit performs the error detection on an icon or any other object when the icon or any other object is displayed in the video and does not perform the error detection when the icon or any other object is not displayed in the video. The technology that allows the image search and the error detection to be performed as a series of processes is not disclosed in JP-A-2012-35677 or other related technologies.

In the present embodiment, the search circuit may determine the cross-correlation between the display image and the reference image and evaluate whether or not the cross-correlation has a correlation value greater than a detection threshold. When the cross-correlation has a correlation value greater than the detection threshold, the search circuit may detect the position corresponding to the correlation value greater than the detection threshold as the display position, and when the cross-correlation has no correlation value greater than the detection threshold, the search circuit may detect no display position.

According to the present embodiment, the search circuit can detect a position where the degree of correlation between the display image and the reference image is large as the display position of the foreground image. A series of actions can then be achieved as follows: When the search circuit can detect the display position, the error detection circuit performs the error detection; and when the search circuit cannot detect the display position, the error detection circuit does not perform the error detection.

In the present embodiment, the search circuit may divide the display image into a plurality of band-shaped areas, divide each of the plurality of band-shaped areas into a plurality of individual areas, and search each of the plurality of individual areas.

According to the present embodiment, the cross-correlation between each of the individual areas and the reference image is calculated, and the cross-correlations calculated for the individual areas can be combined with one another to acquire the cross-correlation between the display image and the reference image. Further, the parallel calculation of the cross-correlations between the individual areas and the reference image can improve the searching speed. For example, when the error detection is performed on a video, it is desirable that the delay that occurs before the error detection is completed is small, and improvement in the processing speed of the cross-correlation accelerates the error detection.

In the present embodiment, the search circuit may perform the search by calculating the cross-correlation between the display image and the reference image using Fourier transform and inverse Fourier transform.

According to the present embodiment, the cross-correlation is provided by multiplying the Fourier transformed display image by the Fourier transformed reference image in the frequency domain and then performing inverse Fourier transform on the result of the multiplication. The processing speed of the Fourier transform and inverse Fourier transform can be improved by performing the Fourier transform and inverse Fourier transform on an individual area basis.

In the present embodiment, the error detection circuit may perform the subsampling, which reduces the number of pixels or resolution of the display image and the reference image, determine the distance information representing the distance in the color space between the pixel values of the subsampled display image and the pixel values of the subsampled reference image, and determine the indicator from the distance information.

The distance in the color space between the pixel values of the subsampled display image and the pixel values of the subsampled reference image should be small when the shapes in the display image and the reference image agree with each other. The degree of agreement between the shapes can therefore be properly assessed by using the distance in the color space. Since the subsampling averages the pixel values, the effect of a minor error that does not affect the shapes can be reduced.

In the present embodiment, the error detection circuit may determine the indicator from the value resulting from the division of a given threshold by the distance information.

The higher the degree of agreement between the shapes, the smaller the distance represented by the distance information. Dividing a given threshold by the distance information therefore allows determination of the indicator in such a way that the greater the degree of agreement between the shapes, the greater the value of the indicator.

In the present embodiment, the error detection circuit may perform product-sum operation between the pixel values of the edge image of the display image and the pixel values of the edge image of the reference image and determine the indicator from the result of the product-sum operation.

An edge image is an image in which the edge quantity is defined as the pixel value of each pixel. When the shapes in the display image and the reference image agree with each other, the edge image of the display image and the edge image of the reference image should have approximately the same edge quantity at the same pixel. Conversely, when the shapes do not agree with each other, the edge positions do not agree with each other between the display image and the reference image. The product-sum operation performed on the edge quantities at the same pixel therefore results in a large value when the shapes agree with each other. Performing the product-sum operation on the edge quantities therefore allows proper assessment of the degree of agreement between the shapes.

In the present embodiment, the error detection circuit may mask an area of the edge image of the display image that is the area corresponding to the background image and perform the product-sum operation using the masked edge image of the display image.

In this way, even when the background contains edges, the edge quantity product-sum operation can be performed with the edges masked. That is, the degree of agreement between the edges of the display image and the reference image can be assessed without being affected by the edges of the background, whereby the accuracy of the error detection can be further improved.

In the present embodiment, the image acquisition circuit may generate the display image by overlaying the second image on a given area of the first image.

The display image can thus be generated, for example, by overlaying an icon, letters, or any other object on the input image. In this case, the overlaid letters or icon corresponds to the foreground image, and the rest of the original input image corresponds to the background image. According to another aspect of the present disclosure, when the error detection is performed on the thus generated display image, it can be determined that an error has occurred when the icon or letters are not properly overlaid so that the icon or letters cannot be recognized by the user.

The electronic instrument according to the present embodiment includes the circuit apparatus described in any of the aforementioned sections.

The error detection method according to the present embodiment searches the display image for the display position of the foreground image, which is an image of a given area of the display image, based on the reference image, which serves as a reference for the foreground image. The error detection method determines histograms of the pixel values of the display image based on the display position searched for. The error detection method performs the correlation operation using the histograms. The error detection method determines an indicator representing the degree of dissimilarity between the foreground image and the background image corresponding to the background of the foreground image based on the result of the correlation operation. The error detection method performs the error detection on the display image based on the indicator.

The error detection method according to the present embodiment searches the display image for the display position of the foreground image, which is an image of a given area of the display image, based on the reference image, which serves as a reference for the foreground image. The error detection method determines an indicator representing the degree of agreement between the foreground image and the reference image based on the display position searched for, the pixel values of the display image, and the pixel values of the reference image or based on the display position searched for, the pixel values of the edge image of the display image, and the pixel values of the edge image of the reference image. The error detection method performs the error detection on the display image based on the indicator.

The present embodiment has been described above in detail, and a person skilled in the art will readily appreciate that a large number of variations are conceivable to the extent that they do not substantially depart from the novel items and effects of the present disclosure. Such variations are all therefore assumed to fall within the scope of the present disclosure. For example, a term described at least once in the specification or the drawings along with a different term having a broader meaning or the same meaning can be replaced with the different term anywhere in the specification or the drawings. Further, all combinations of the present embodiment and the variations fall within the scope of the present disclosure. Moreover, the configuration, operation, and other factors of each of the circuit apparatus, the electronic instrument, and other apparatuses are not limited to those described in the present embodiment and can be changed in a variety manners.

What is claimed is:

1. A circuit apparatus comprising:
    an image acquisition circuit configured to acquire a display image including a foreground image in a given area of the display image and a background image corresponding to a background of the foreground image out of the display image;
    an error detection circuit configured to:
        determine histograms of pixel values of the display image to perform a correlation operation using the histograms;
        determine an indicator representing a degree of dissimilarity between the foreground image and the background image based on a result of the correlation operation; and
        perform an error detection on the display image based on the indicator; and
    a search circuit configured to:
        divide the display image into a plurality of band-shaped areas and divide each of the plurality of band-shaped areas into a plurality of individual areas;
        perform fast Fourier transform processing on each edge image of the plurality of individual areas of the display image to obtain a first two-dimensional fast Fourier transform result including a plurality of first spatial frequency components;
        perform the fast Fourier transform processing on an edge image of a reference image of the foreground image to obtain a second two-dimensional fast Fourier transform result including a plurality of second spatial frequency components, wherein the plurality of first and second spatial frequency components have the same number of rows and columns; and
        perform inverse fast Fourier transform processing on the first and second two-dimensional fast Fourier transform results, by comparing every component of the plurality of first spatial frequency components with every corresponding component of the plurality of second spatial frequency components, to obtain an inverse fast Fourier transform result, the inverse fast Fourier transform result corresponding to a first plurality of cross-correlations between every edge image of the plurality of individual areas of the display image and the edge image of the reference image of the foreground image,
    wherein the error detection circuit is further configured to:
        generate a second cross-correlation between the display image and the reference image based on the first plurality of cross-correlations;
        determine whether the second cross-correlation contains a value that is equal to or more than a threshold value;
        detect a foreground image position where the second cross-correlation contains the value that is equal to or more than the threshold value as a position of the foreground image in the display image;
        set a target area in the display image based on the detected foreground image position, the target area being a rectangular area in which the detected foreground image position is a center thereof and the foreground image is contained; and
        perform the error detection with respect to the target area of the display image based on the indicator.

2. The circuit apparatus according to claim 1,
wherein the error detection circuit is configured to perform the error detection when the foreground image position is detected, and
the error detection circuit does not perform the error detection when the foreground image position is not detected.

3. The circuit apparatus according to claim 2,
wherein the error detection circuit does not detect the foreground image position when the second cross-correlation contains the value that is less than the threshold value.

4. The circuit apparatus according to claim 1,
wherein the error detection circuit is further configured to:
    determine a histogram of each of components that form a color space;
    perform an autocorrelation operation on the histogram of each of the components to determine a distance at which an autocorrelation value peaks for each of the components; and
    determine the indicator based on a largest distance out of the determined distances.

5. The circuit apparatus according to claim 1,
wherein the error detection circuit is further configured to:
    determine a first histogram of each of components that form a color space from the display image and a second histogram of each of the components from the reference image;

perform a cross-correlation operation on the first histogram and the second histogram for each of the components; and
determine the indicator based on a peak value of a peak provided by the cross-correlation.

6. The circuit apparatus according to claim 1,
wherein the error detection circuit is further configured to:
determine a second indicator representing a degree of agreement between the foreground image and the reference image based on the pixel values of the display image and pixel values of the reference image or pixel values of an edge image of the display image and pixel values of an edge image of the reference image; and
perform the error detection based on the indicator and the second indicator.

7. The circuit apparatus according to claim 1,
wherein the image acquisition circuit is configured to generate the display image by overlaying a second image on the given area of a first image, and
the background image corresponds to the first image.

8. An error detection method comprising:
acquiring a display image including a foreground image in a given area of the display image and a background image corresponding to a background of the foreground image out of the display image;
determining histograms of pixel values of the display image to perform a correlation operation using the histograms;
determining an indicator representing a degree of dissimilarity between the foreground image and the background image based on a result of the correlation operation;
dividing the display image into a plurality of band-shaped areas and divide each of the plurality of band-shaped areas into a plurality of individual areas;
performing fast Fourier transform processing on each edge image of the plurality of individual areas of the display image to obtain a first two-dimensional fast Fourier transform result including a plurality of first spatial frequency components;
performing the fast Fourier transform processing on an edge image of a reference image of the foreground image to obtain a second two-dimensional fast Fourier transform result including a plurality of second spatial frequency components, wherein the plurality of first and second spatial frequency components have the same number of rows and columns;
performing inverse fast Fourier transform processing on the first and second two-dimensional fast Fourier transform results, by comparing every component of the plurality of first spatial frequency components with every corresponding component of the plurality of second spatial frequency components, to obtain an inverse fast Fourier transform result, the inverse fast Fourier transform result corresponding to a first plurality of cross-correlations between every edge image of the plurality of individual areas of the display image and the edge image of the reference image of the foreground image;
generating a second cross-correlation between the display image and the reference image based on the first plurality of cross-correlations;
determining whether the second cross-correlation contains a value that is equal to or more than a threshold value;
detecting a foreground image position where the second cross-correlation contains the value that is equal to or more than the threshold value as a position of the foreground image in the display image;
setting a target area in the display image based on the detected foreground image position, the target area being a rectangular area in which the detected foreground image position is a center thereof and the foreground image is contained; and
performing an error detection with respect to the target area of the display image based on the indicator.

\* \* \* \* \*